(12) United States Patent
Eguchi

(10) Patent No.: US 6,917,476 B2
(45) Date of Patent: Jul. 12, 2005

(54) ZOOM LENS SYSTEM

(75) Inventor: Masaru Eguchi, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/414,280

(22) Filed: Apr. 16, 2003

(65) Prior Publication Data

US 2003/0197949 A1 Oct. 23, 2003

(30) Foreign Application Priority Data

Apr. 19, 2002 (JP) .............................. 2002-118067

(51) Int. Cl.$^7$ .......................................... G02B 15/177
(52) U.S. Cl. ............................... 359/689; 359/682
(58) Field of Search ..................... 359/689, 680–682

(56) References Cited

U.S. PATENT DOCUMENTS

| | | | |
|---|---|---|---|
| 6,124,984 A | 9/2000 | Shibayama et al. | |
| 6,515,804 B2 * | 2/2003 | Watanabe et al. | 359/689 |
| 6,597,513 B2 * | 7/2003 | Minefuji | 359/689 |
| 2003/0123156 A1 * | 7/2003 | Minefuji | 359/682 |
| 2003/0210471 A1 * | 11/2003 | Mihara et al. | 359/691 |

FOREIGN PATENT DOCUMENTS

| JP | 10170826 | 6/1998 |
|---|---|---|
| JP | 10213745 | 8/1998 |

OTHER PUBLICATIONS

English Language Translation of JP Appln. No. 10-213745.

* cited by examiner

Primary Examiner—Scott J. Sugarman
Assistant Examiner—Deborah Raizen
(74) Attorney, Agent, or Firm—Greenblum & Bernstein, P.L.C.

(57) ABSTRACT

A zoom lens system includes a negative first lens group, a positive second lens group, and a positive third lens group. Upon zooming from the short to long focal length extremities, the distance between the first and second lens groups decreases, and the distance between the second and third lens groups increases. The zoom lens system satisfies the following conditions:

$$0.4 < (fw \cdot ft)^{1/2} / |f1| < 0.8 \, (f1<0) \qquad (1)$$

$$0.7 < (fw \cdot ft)^{1/2} / f2 < 1.4 \qquad (2)$$

$$0.4 < (fw \cdot ft)^{1/2} / f3 < 0.9 \qquad (3)$$

wherein fw and ft designate the focal lengths of the entire zoom lens system at the short and long focal length extremities, respectively; and fi designates the focal length of the ith lens group (i=1~3).

8 Claims, 19 Drawing Sheets

Fig. 1
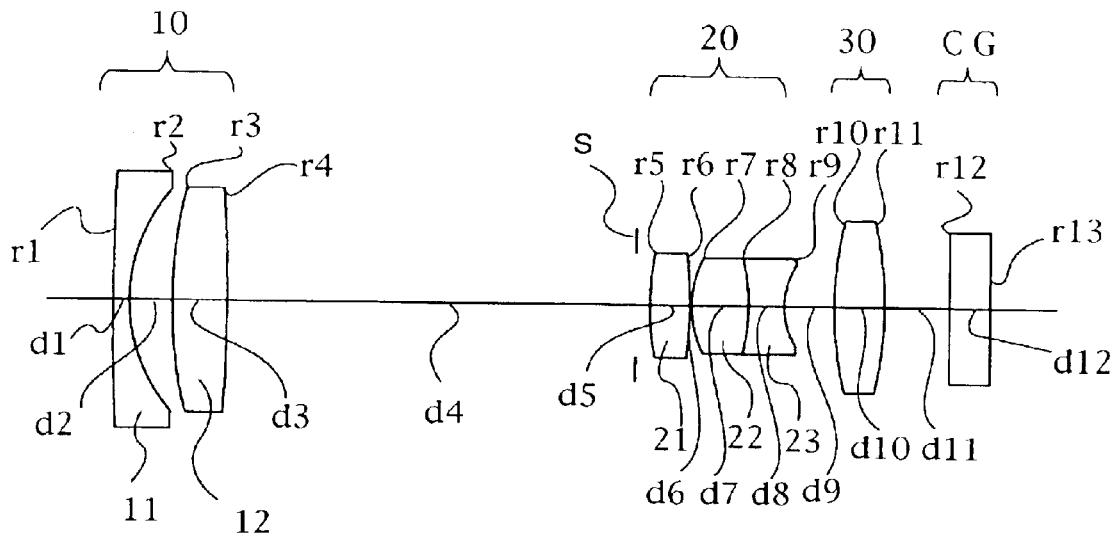
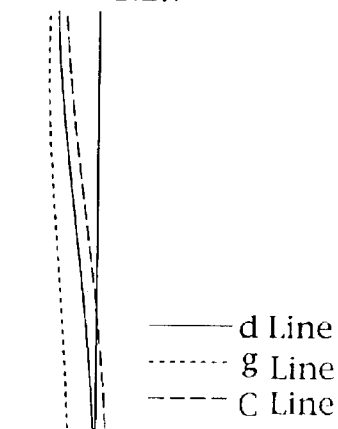
Fig. 2A
SPHERICAL ABERRATION
CHROMATIC ABERRATION
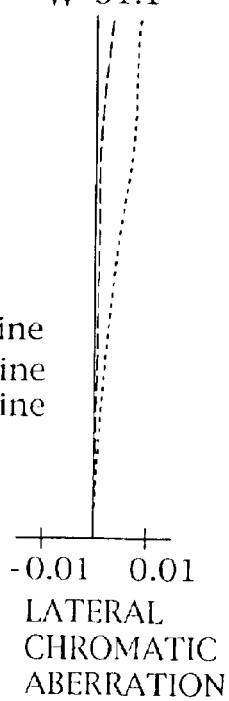
Fig. 2B
LATERAL CHROMATIC ABERRATION
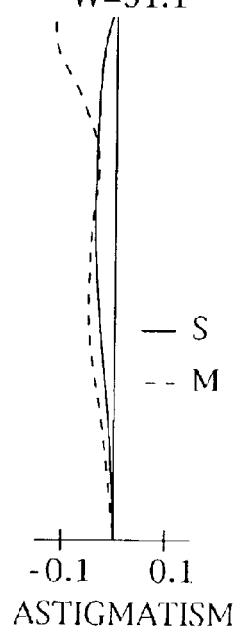
Fig. 2C
ASTIGMATISM
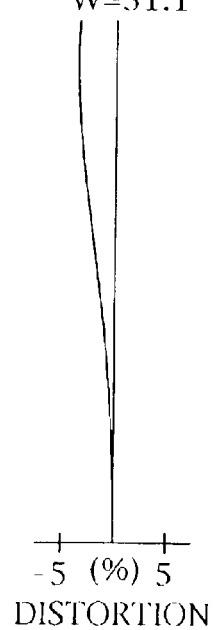
Fig. 2D
DISTORTION

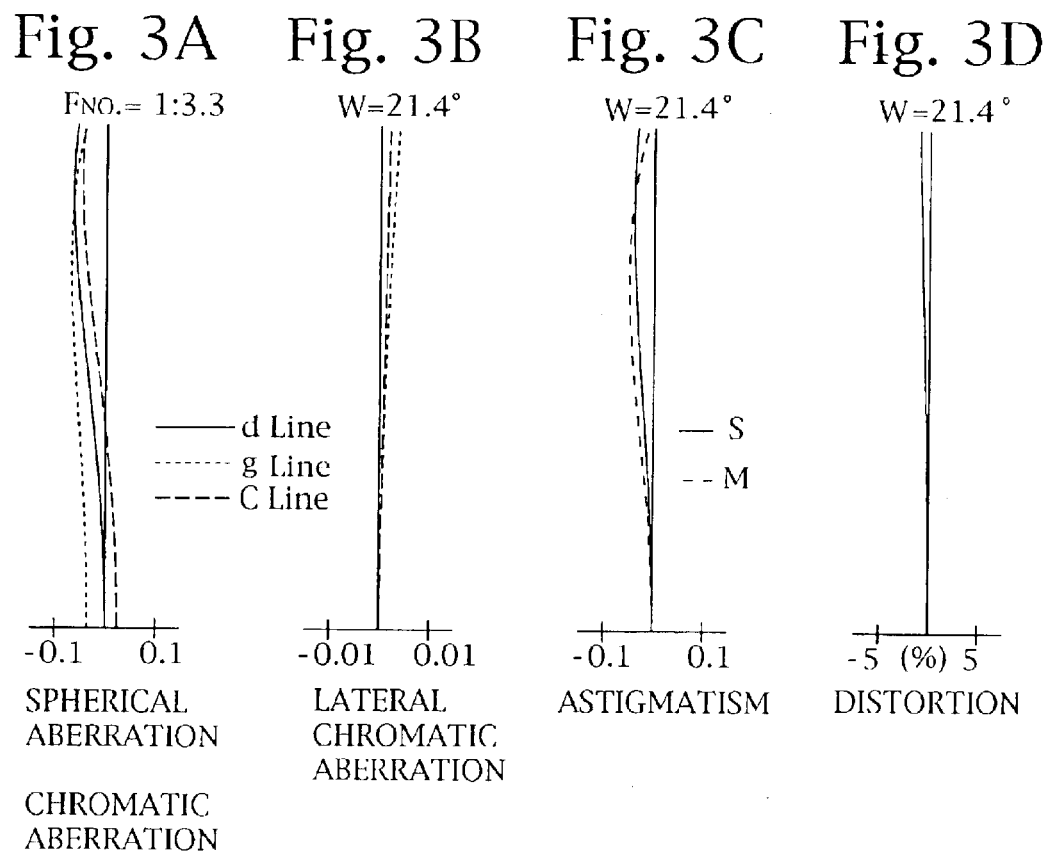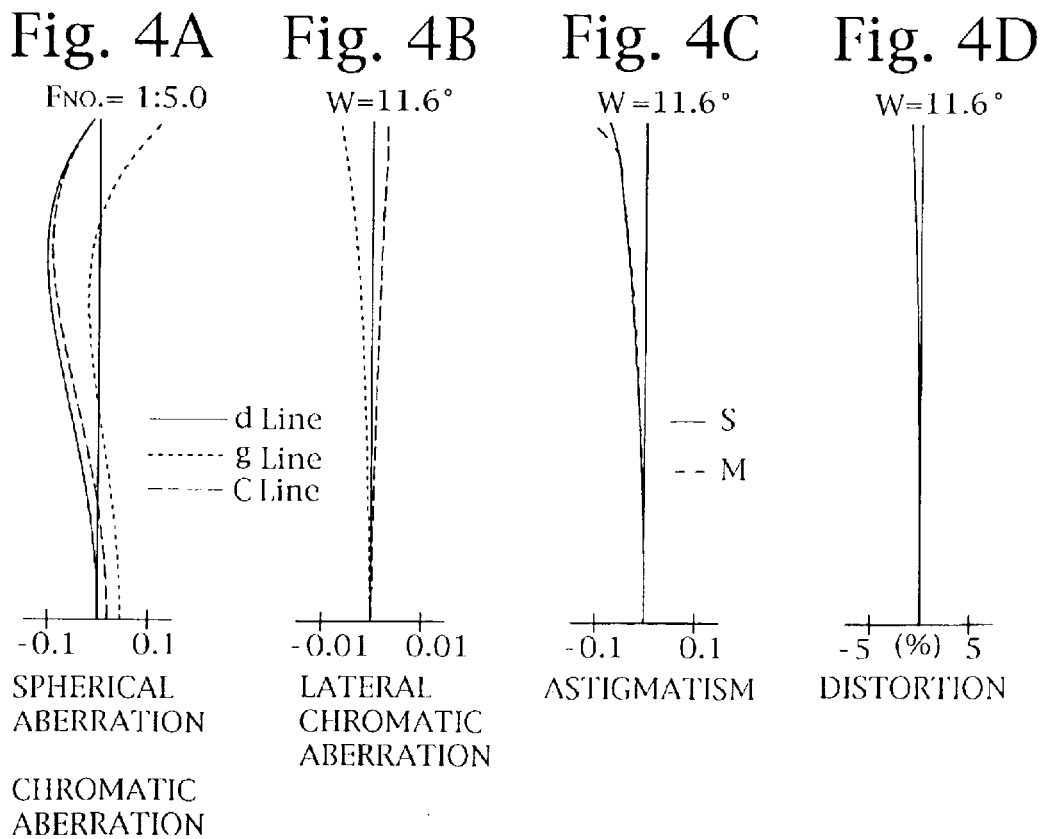

Fig. 5
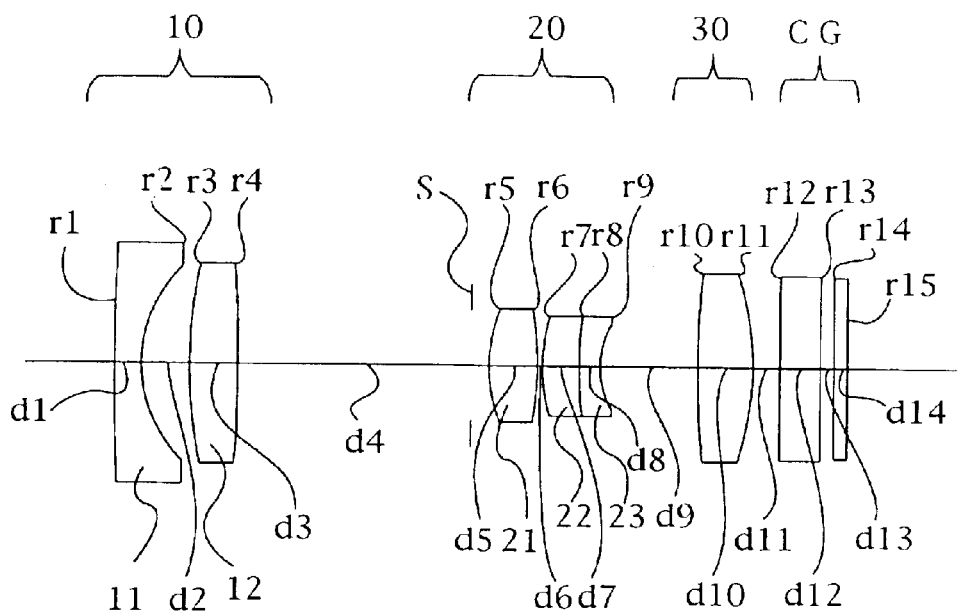
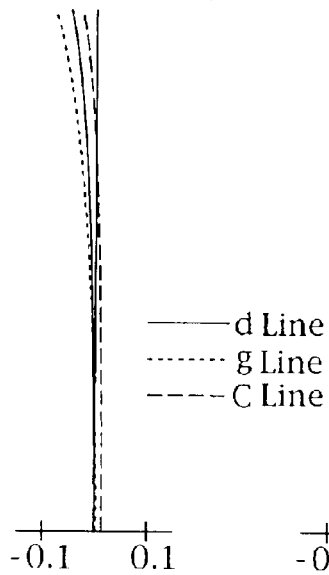
Fig. 6A
Fno.= 1:2.8
—— d Line
······ g Line
- - - C Line
-0.1  0.1
SPHERICAL
ABERRATION
CHROMATIC
ABERRATION
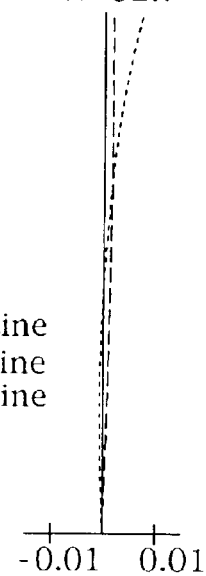
Fig. 6B
W=32.7°
-0.01  0.01
LATERAL
CHROMATIC
ABERRATION
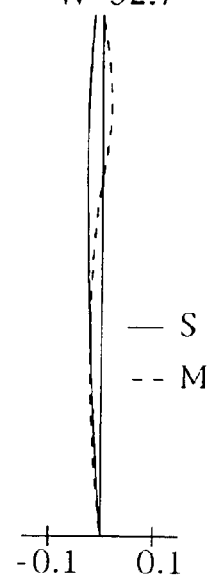
Fig. 6C
W=32.7°
—— S
- - M
-0.1  0.1
ASTIGMATISM
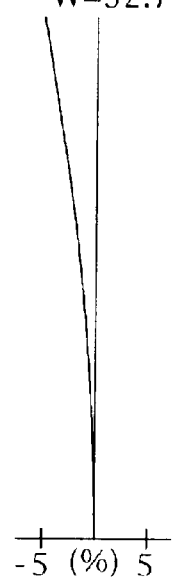
Fig. 6D
W=32.7°
-5 (%) 5
DISTORTION

FNO.= 1:3.2

-0.1  0.1
SPHERICAL
ABERRATION

CHROMATIC
ABERRATION

— d Line
······ g Line
---- C Line

W=25.5°

-0.01  0.01
LATERAL
CHROMATIC
ABERRATION

W=25.5°

-0.1  0.1
ASTIGMATISM

— S
-- M

W=25.5°

-5 (%) 5
DISTORTION

FNO.= 1:4.3

-0.1  0.1
SPHERICAL
ABERRATION

CHROMATIC
ABERRATION

— d Line
······ g Line
---- C Line

W=16.8°

-0.01  0.01
LATERAL
CHROMATIC
ABERRATION

W=16.8°

-0.1  0.1
ASTIGMATISM

— S
-- M

W=16.8°

-5 (%) 5
DISTORTION

Fig. 9
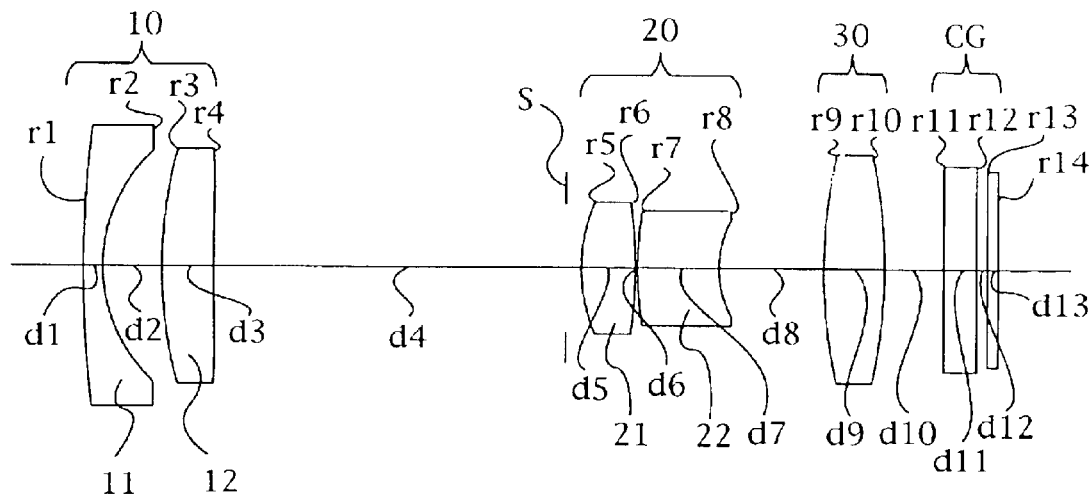
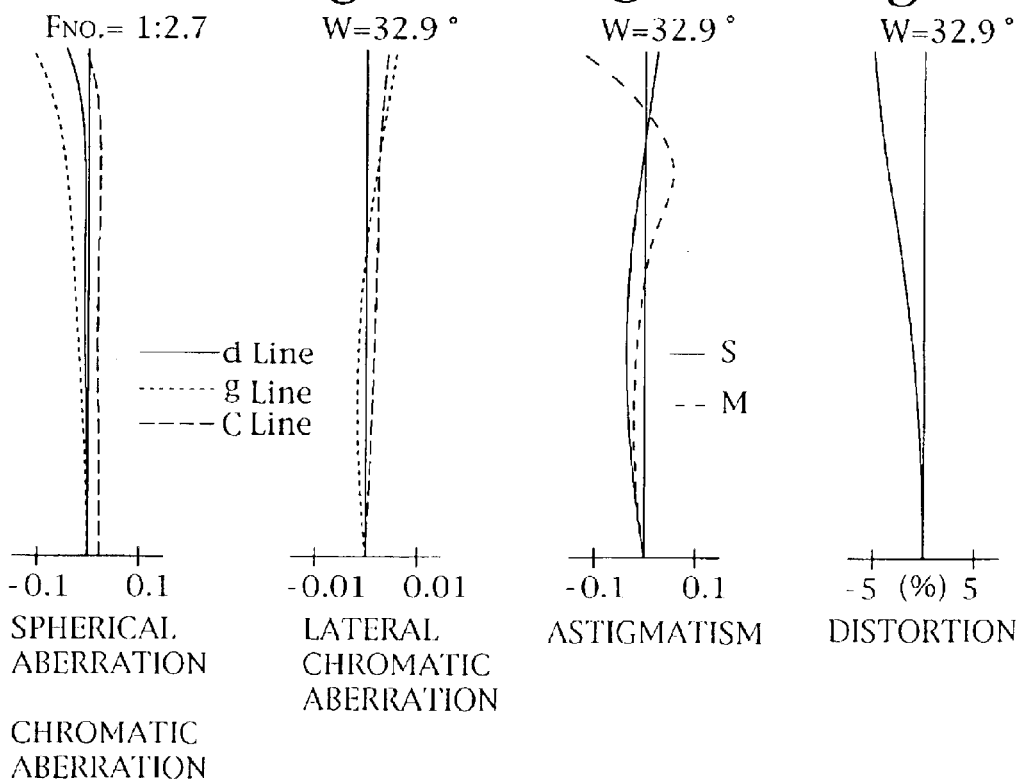

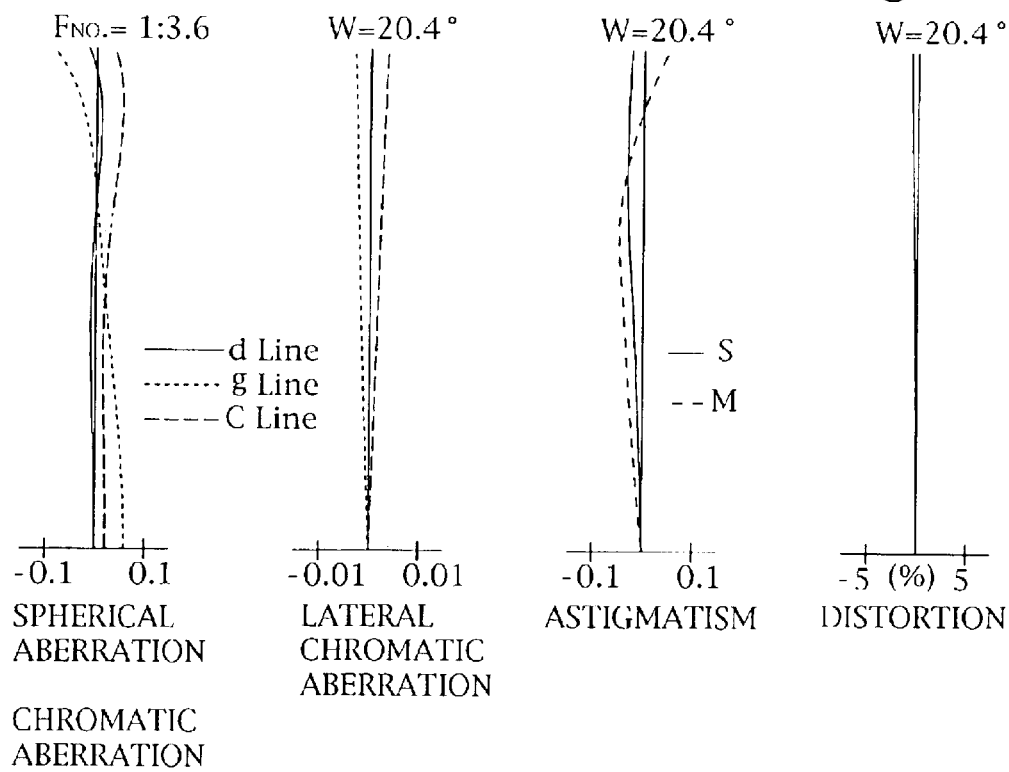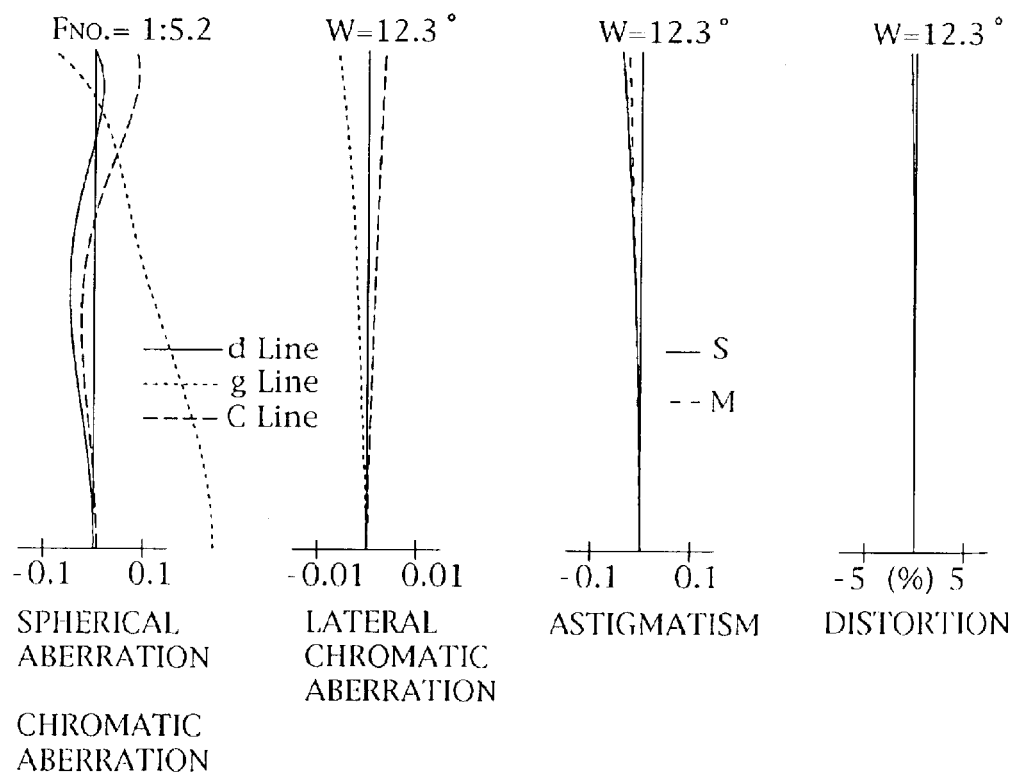

Fig. 13
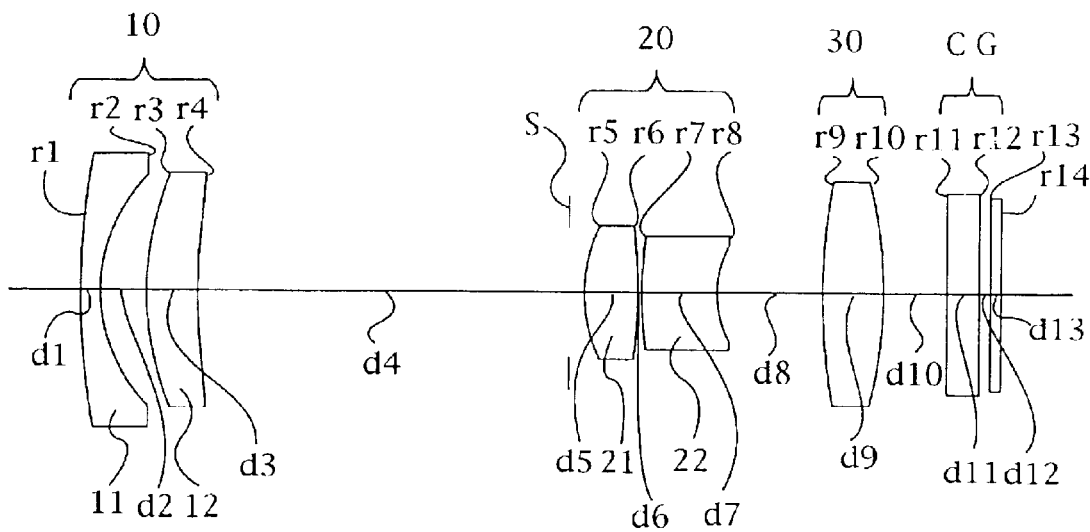
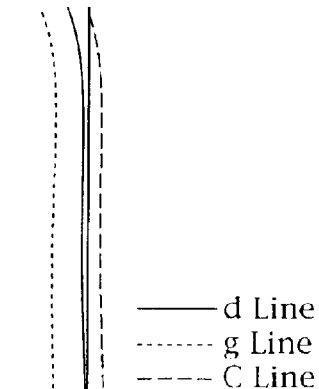
Fig.14A
F$_{NO.}$= 1:2.7
d Line
······ g Line
---- C Line
-0.1  0.1
SPHERICAL
ABERRATION
CHROMATIC
ABERRATION
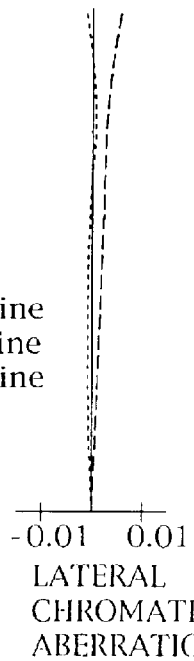
Fig.14B
W=30.4°
-0.01  0.01
LATERAL
CHROMATIC
ABERRATION
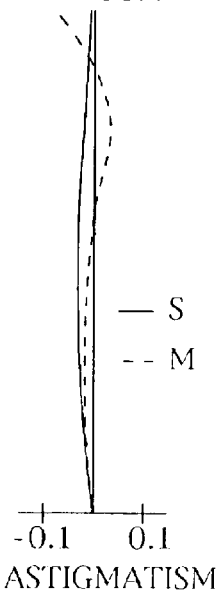
Fig.14C
W=30.4°
— S
-- M
-0.1  0.1
ASTIGMATISM
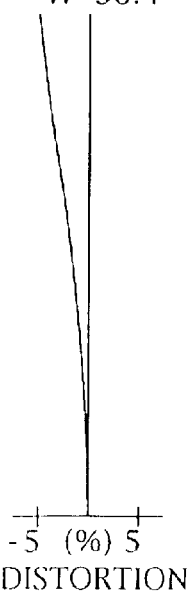
Fig.14D
W=30.4°
-5 (%) 5
DISTORTION

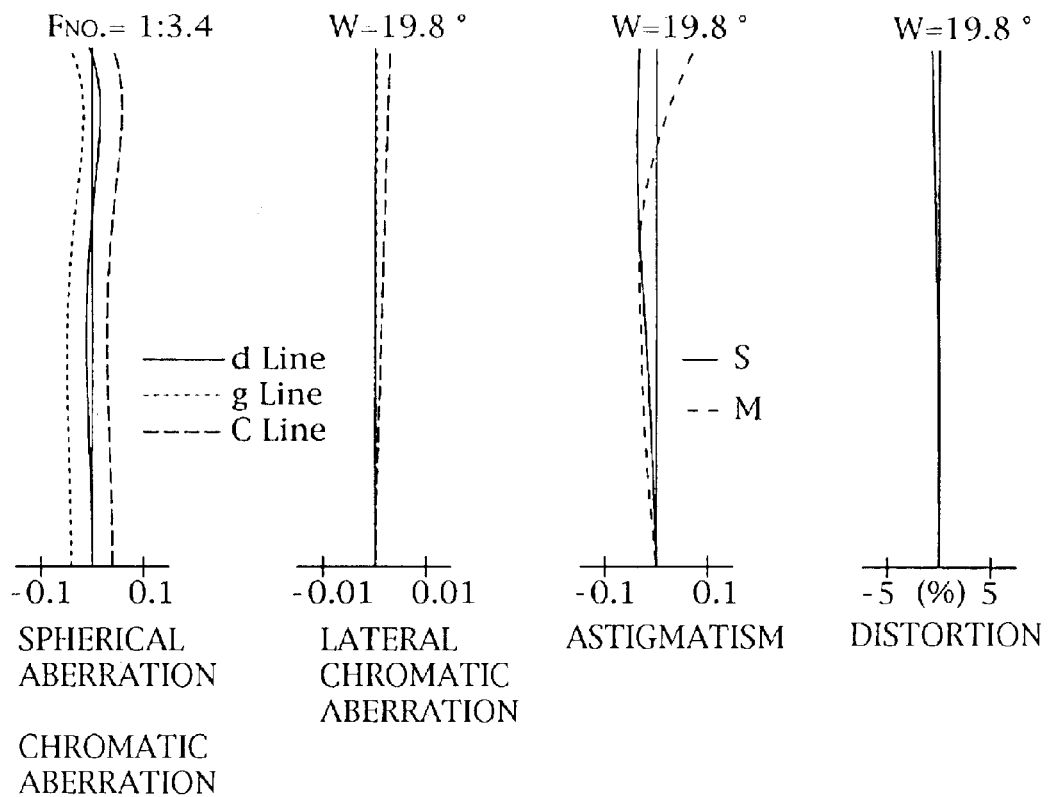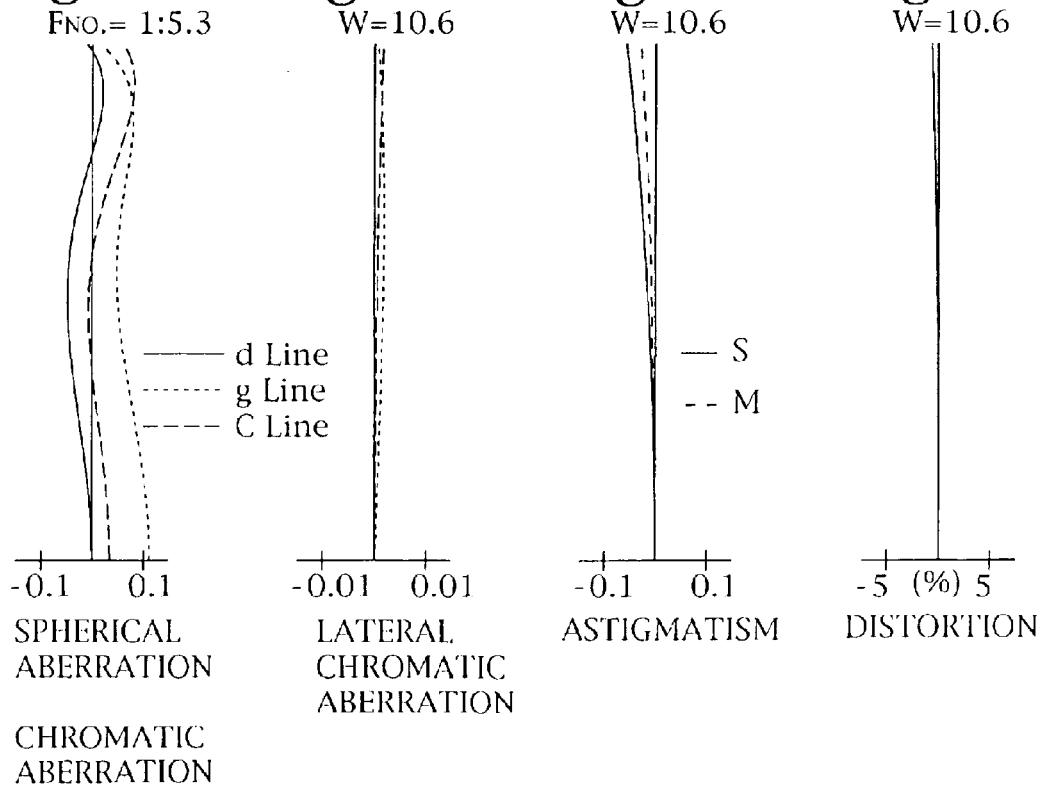

Fig. 17
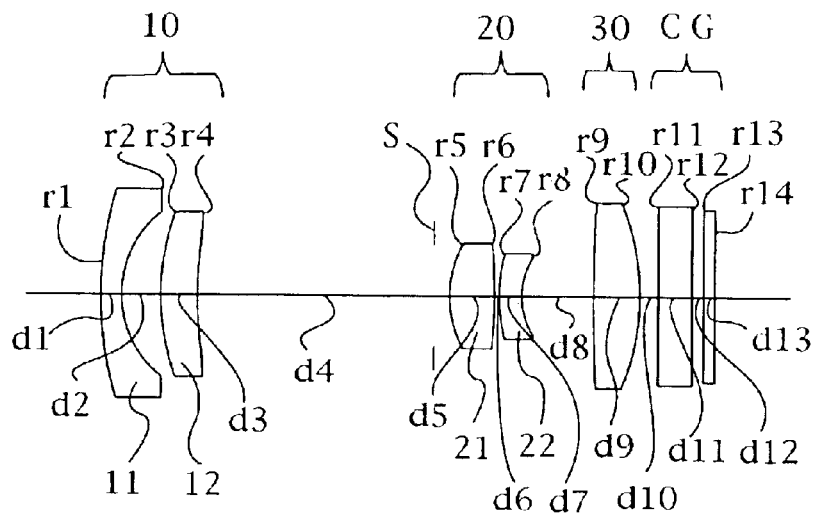
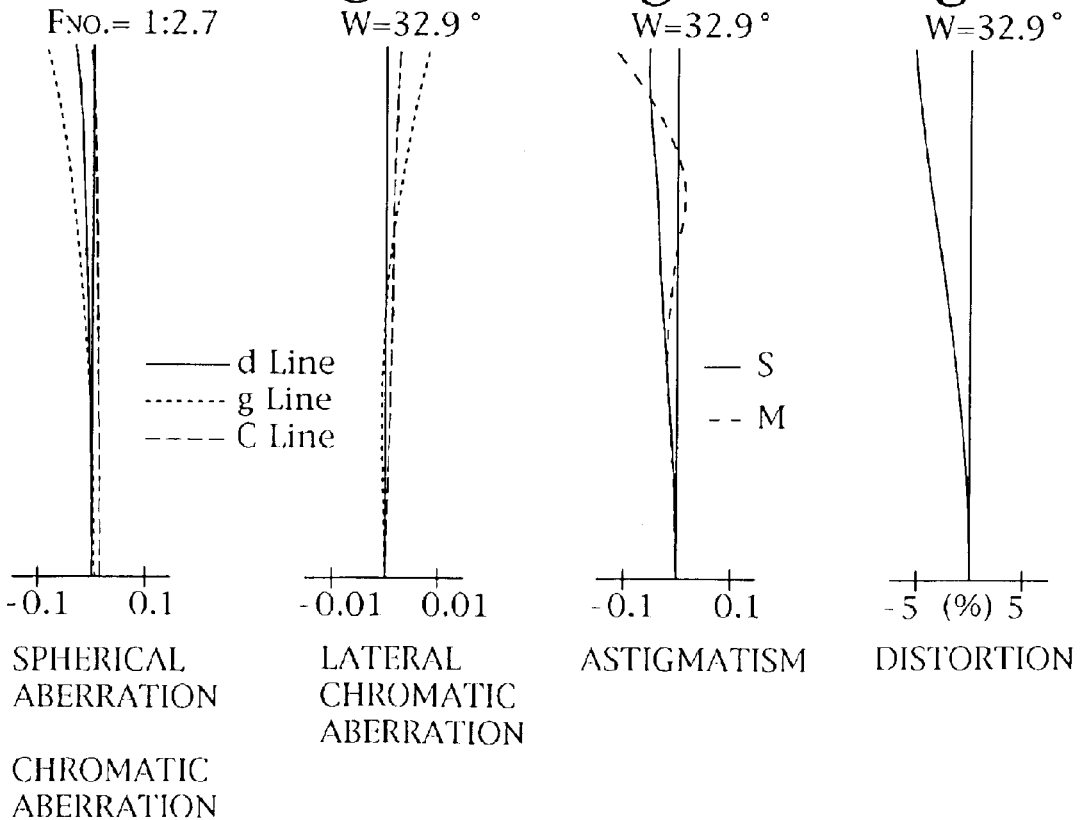
Fig.18A FNO.= 1:2.7
SPHERICAL ABERRATION
CHROMATIC ABERRATION
Fig.18B W=32.9°
LATERAL CHROMATIC ABERRATION
Fig.18C W=32.9°
ASTIGMATISM
Fig.18D W=32.9°
DISTORTION
— d Line
······· g Line
---- C Line
— S
-- M

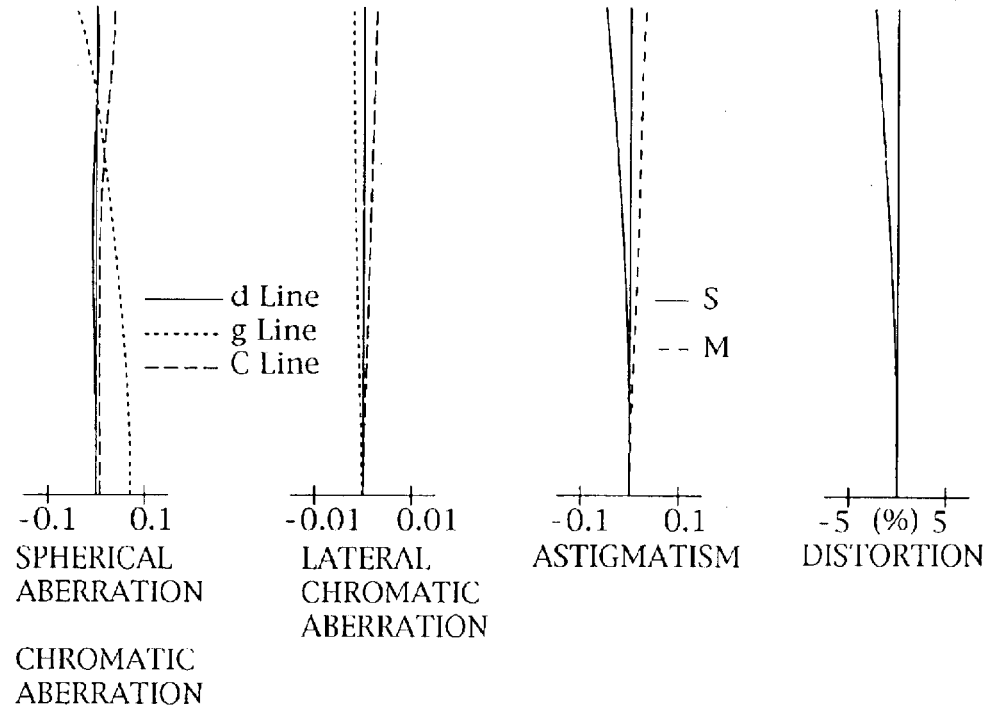
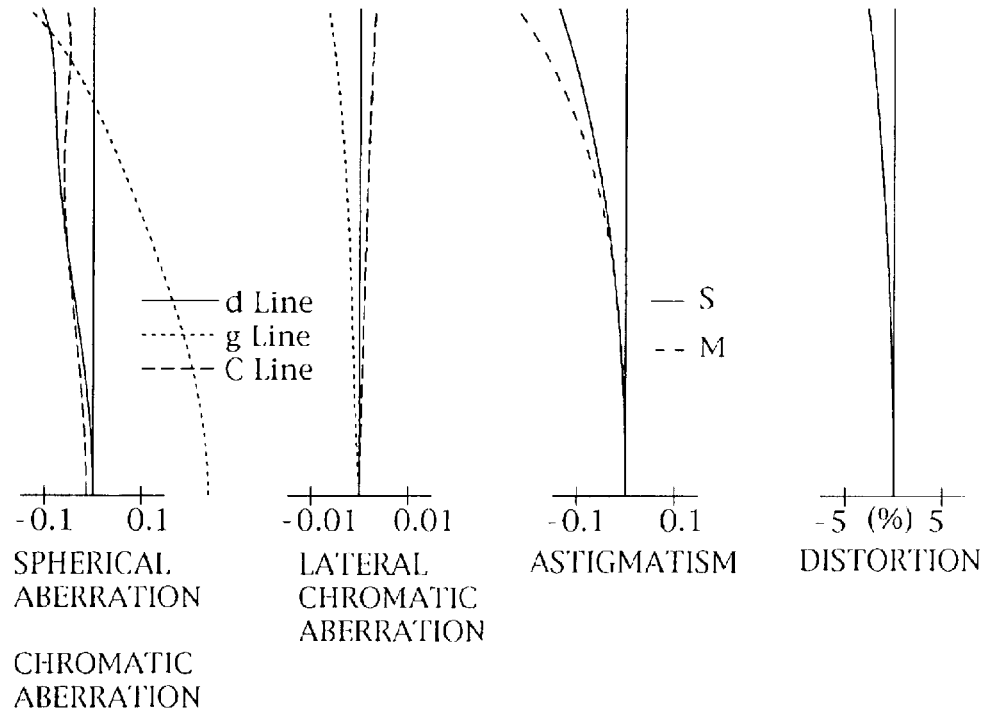

FNO.=1:2.7

W=33.1°

W=33.1°

W=33.1°

——— d Line
········ g Line
---- C Line

— S
-- M

-0.1  0.1
SPHERICAL
ABERRATION
CHROMATIC
ABERRATION

-0.01  0.01
LATERAL
CHROMATIC
ABERRATION

-0.1  0.1
ASTIGMATISM

-5 (%) 5
DISTORTION

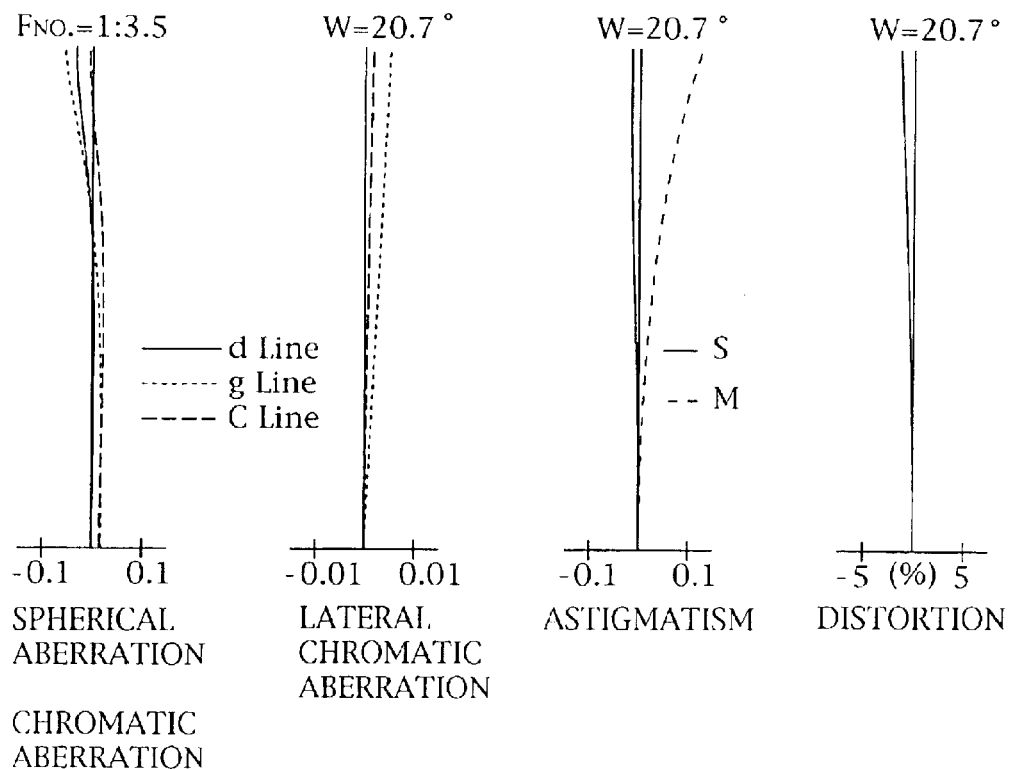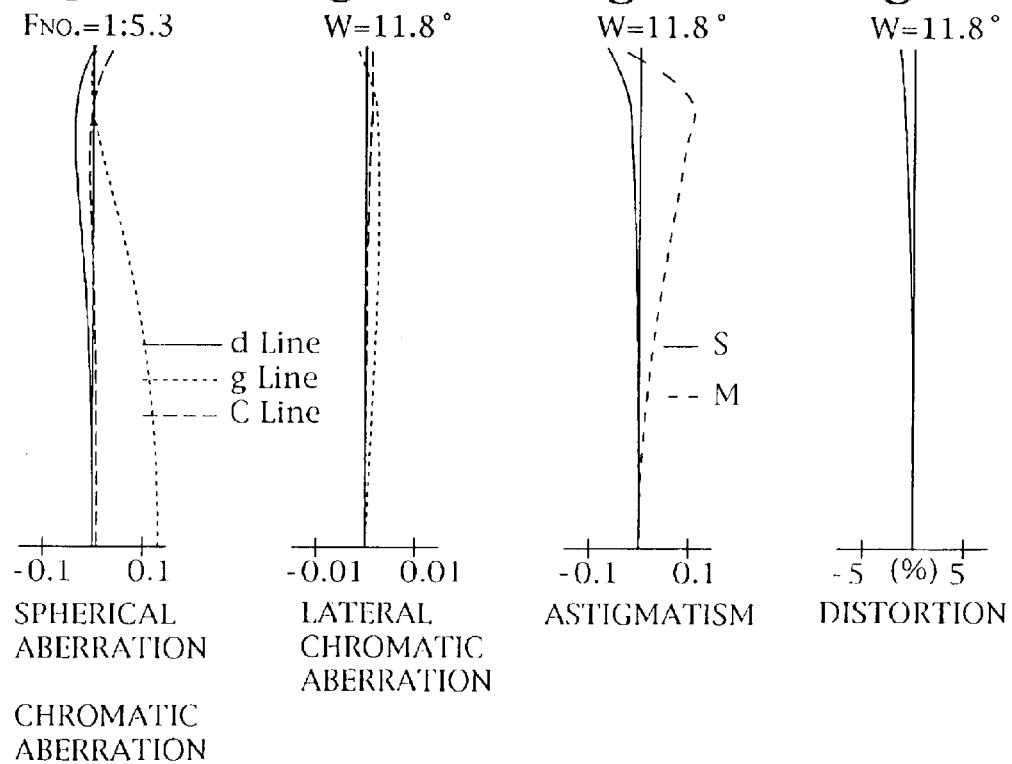

Fig. 25
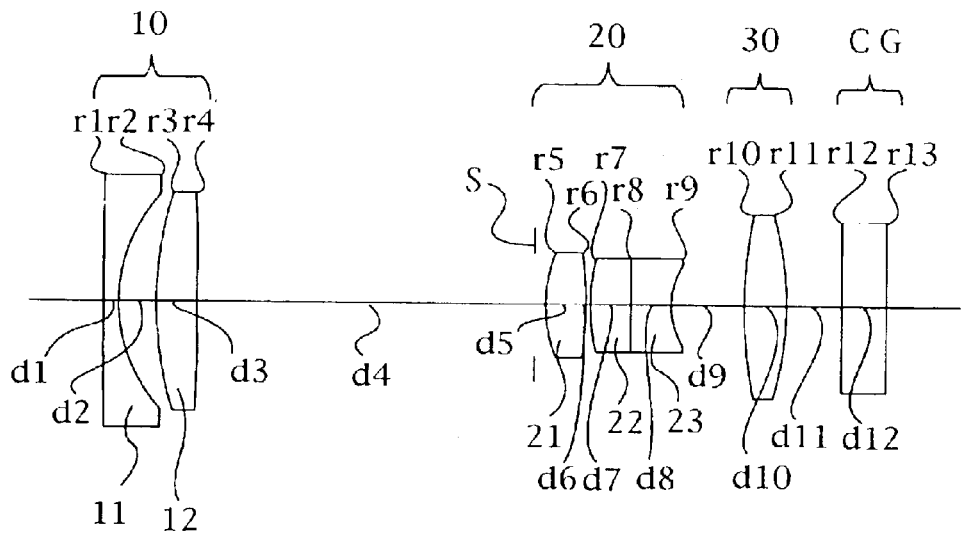
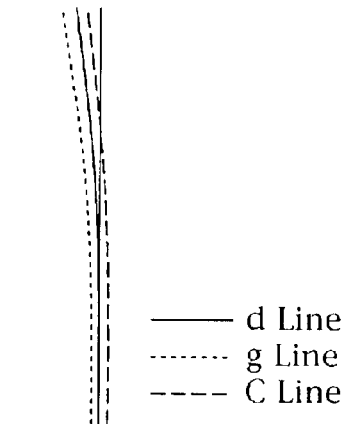
Fig.26A
FNO.=1:2.7
——— d Line
········· g Line
- - - - C Line
SPHERICAL
ABERRATION
CHROMATIC
ABERRATION
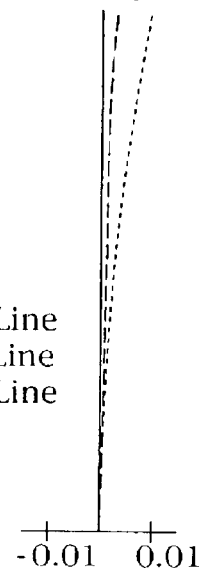
Fig.26B
W=33.1°
LATERAL
CHROMATIC
ABERRATION
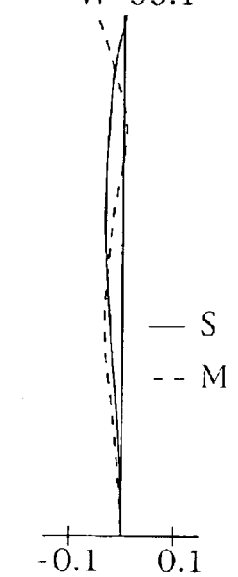
Fig.26C
W=33.1°
— S
- - M
ASTIGMATISM
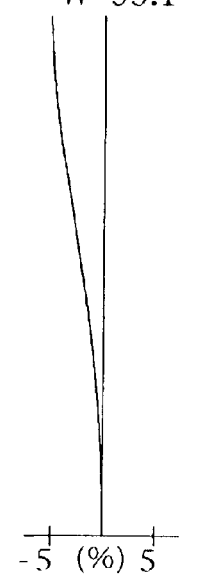
Fig.26D
W=33.1°
DISTORTION

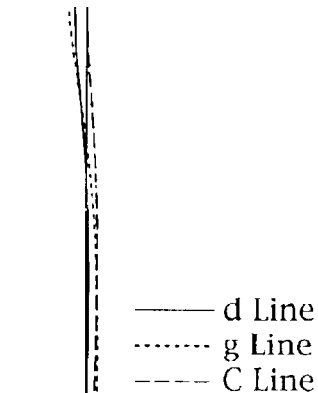
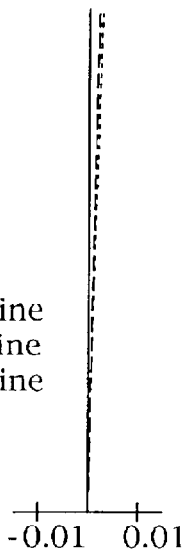
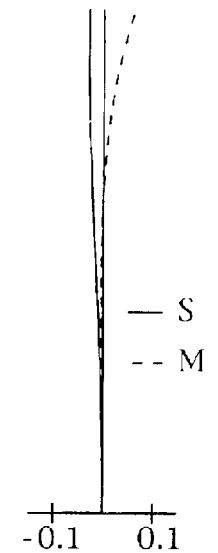
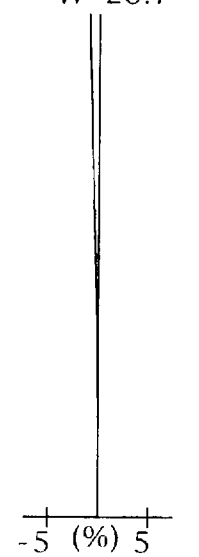
Fig.27A  FNO.=1:3.5  SPHERICAL ABERRATION CHROMATIC ABERRATION (d Line, g Line, C Line)
Fig.27B  W=20.7°  LATERAL CHROMATIC ABERRATION
Fig.27C  W=20.7°  ASTIGMATISM (S, M)
Fig.27D  W=20.7°  DISTORTION
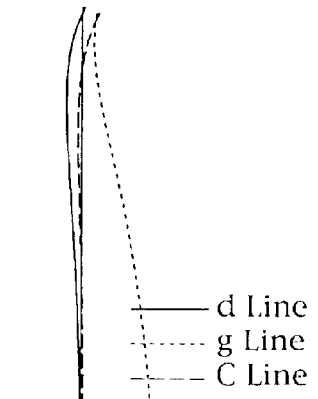
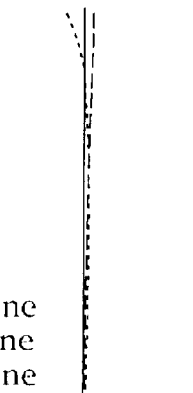
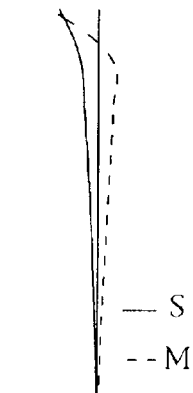
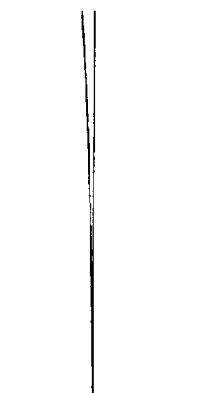
Fig.28A  FNO.=1:5.3  SPHERICAL ABERRATION CHROMATIC ABERRATION (d Line, g Line, C Line)
Fig.28B  W=11.8°  LATERAL CHROMATIC ABERRATION
Fig.28C  W=11.8°  ASTIGMATISM (S, M)
Fig.28D  W=11.8°  DISTORTION Fig. 29
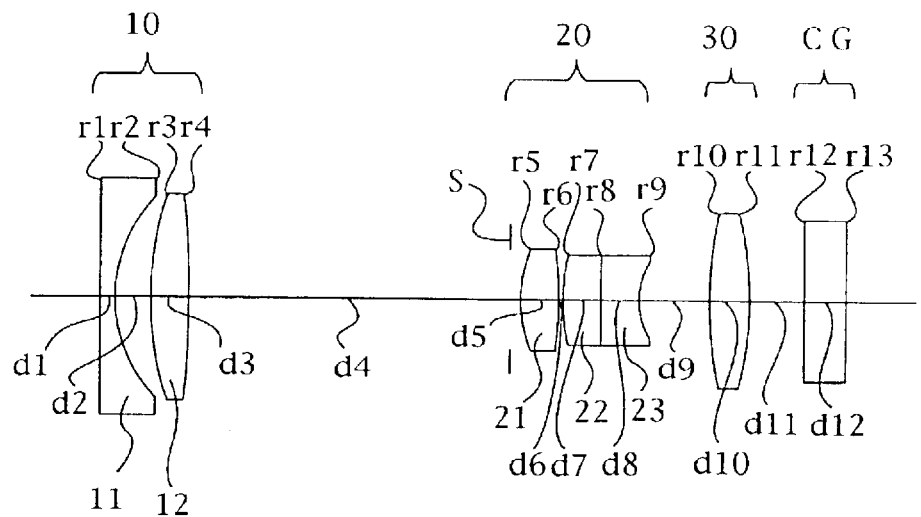
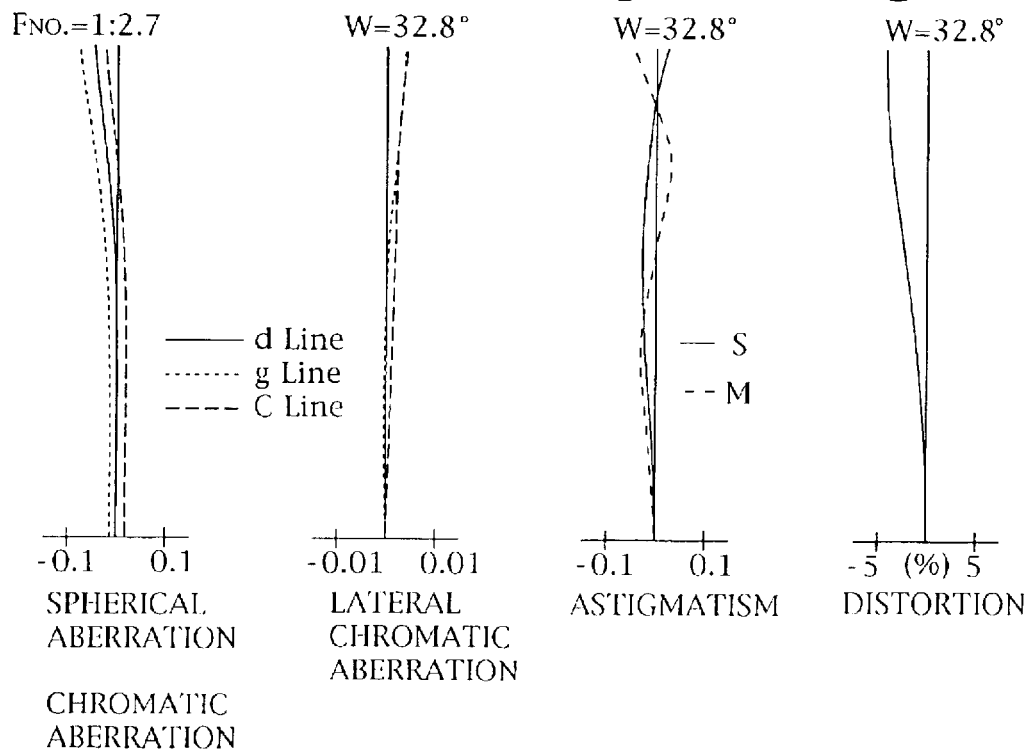
Fig.30A Fig.30B Fig.30C Fig.30D

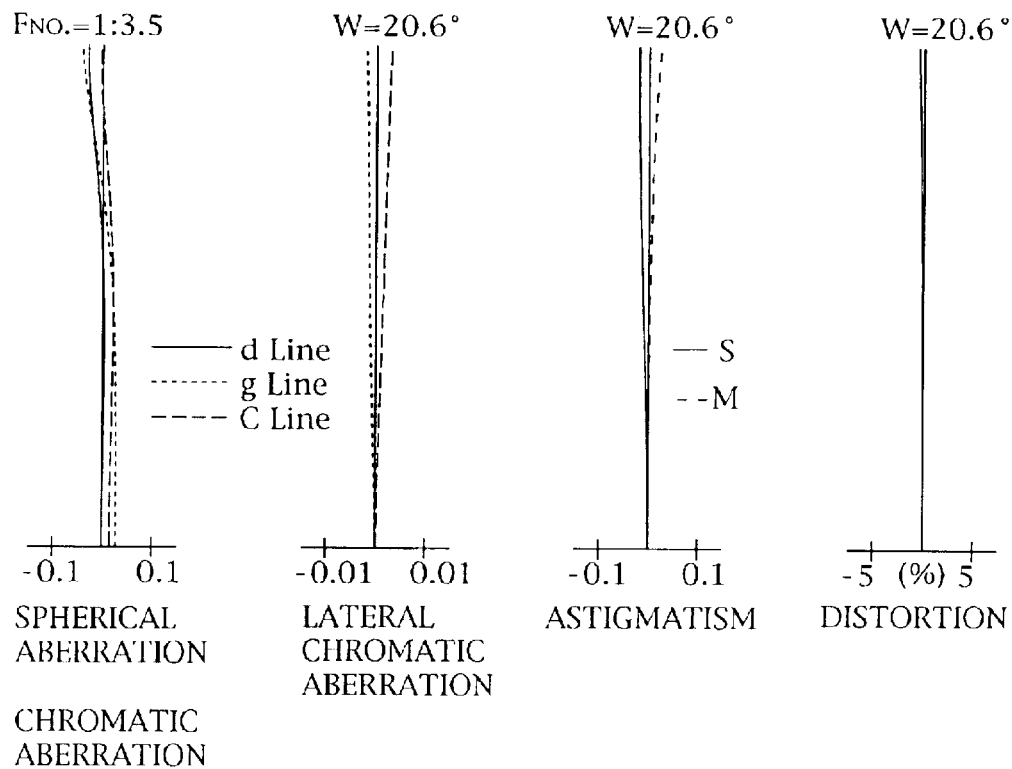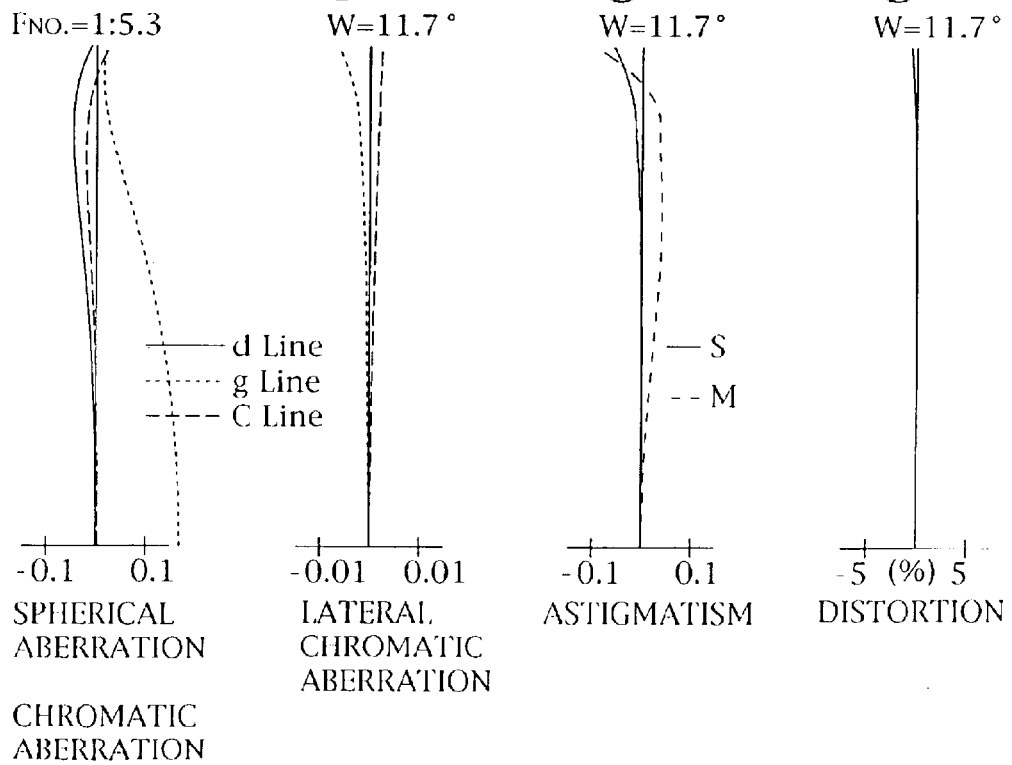

Fno.=1:2.7

W=32.9°

W=32.9°

W=32.9°

—— d Line
········ g Line
- - - - C Line

—— S
- - M

-0.1   0.1
SPHERICAL
ABERRATION
CHROMATIC
ABERRATION

-0.01   0.01
LATERAL
CHROMATIC
ABERRATION

-0.1   0.1
ASTIGMATISM

-5 (%)  5
DISTORTION

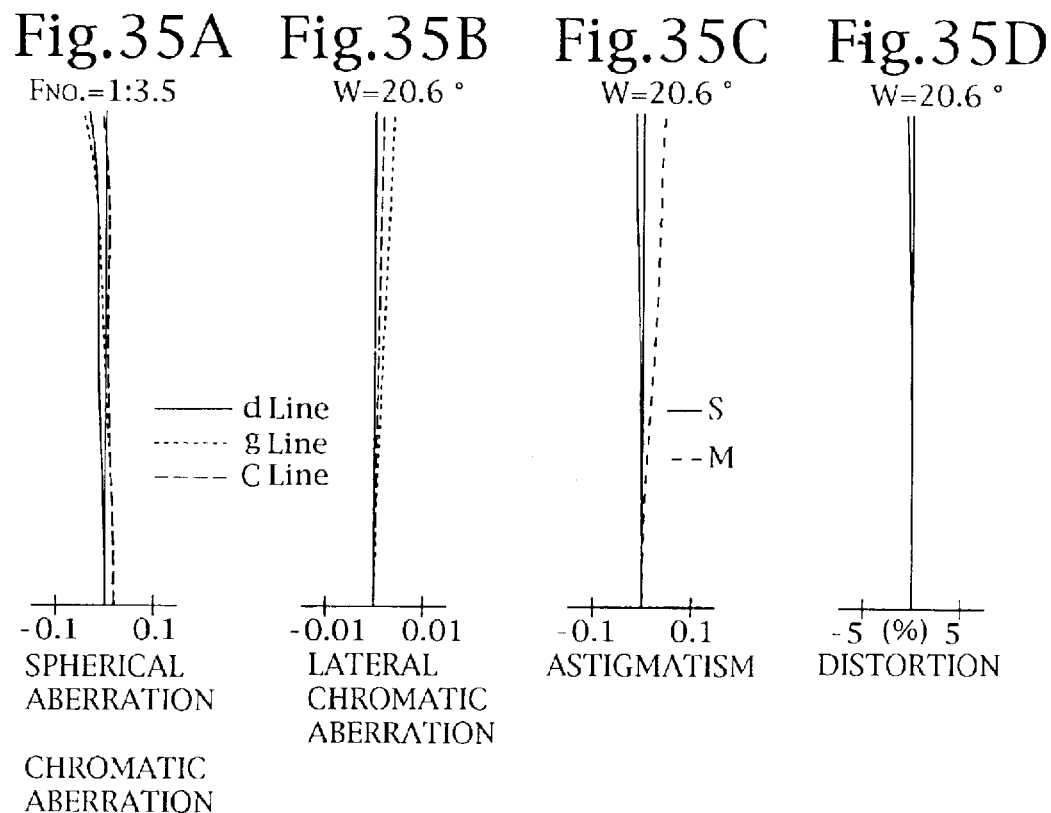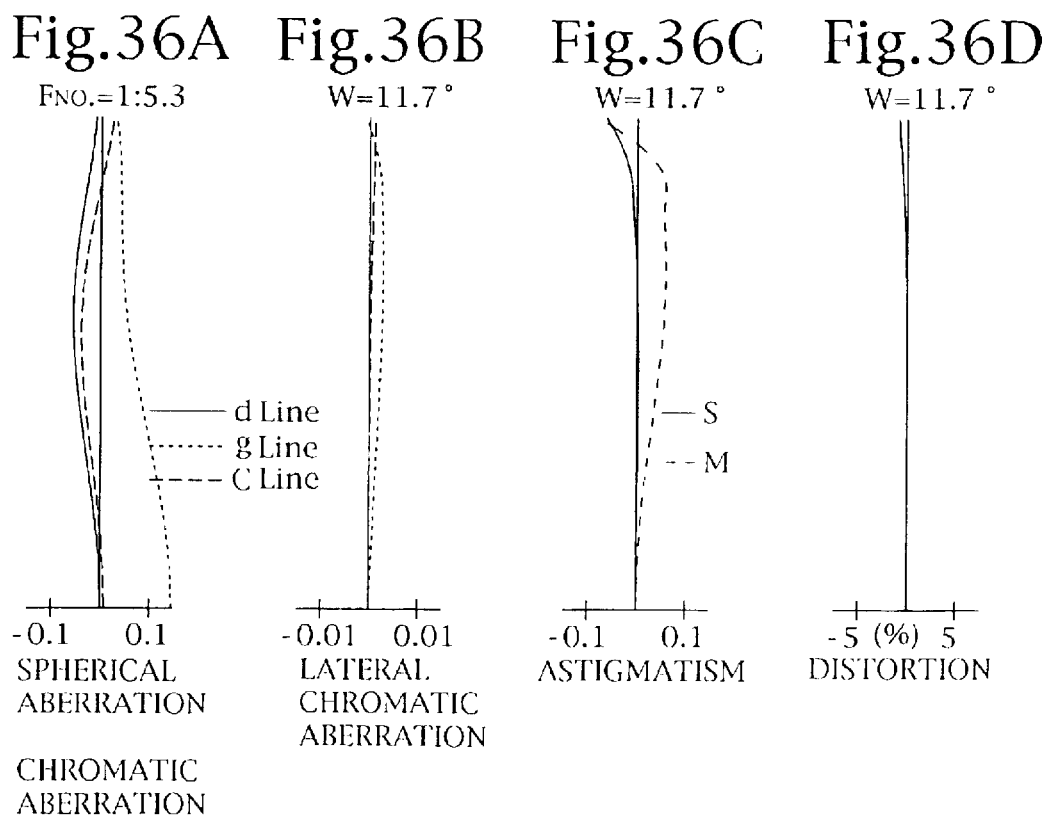

ZOOM LENS SYSTEM

BACKGROUND OF THE INVENTION

1. Field of the Invention

The present invention relates to a zoom lens system which is mainly used in an electronic still camera (digital camera), and has a wide-angle range (a half angle-of-view of more than 30°), such as a zoom ratio of about 2 or 3.

2. Description of the Prior Art

In recent years, there has been an increasing need for further miniaturization and higher definition in digital cameras; and the pixels of CCD imaging devices are being further miniaturized. Accordingly, photographing lens systems of such digital cameras are required to have high resolution; and a long back focal distance is also required to accommodate a filter group. Furthermore, an optical system for a color CCD is required to have good 'telecentricity' in order to prevent shading and color shift, i.e., the light rays which exit from the final lens surface and are incident on the imaging surface are to be as perpendicular to the imaging surface as possible.

As a miniaturized zoom lens system for a compact digital camera, a front-negative lens system (negative-lead type lens system, i.e., telephoto type lens system) can be used in the case where a zoom ratio is up to around 2 to 3. Such lens systems can provide a wider angle of view at the short focal length extremity, and can achieve further miniaturization of the lens system. In particular, the lens diameter of the first lens group (the most object-side lens element) can be made smaller. Due to the above features, the negative-lead type lens system is suitable for a 'telescoping' zoom lens system in which the distance between the lens groups is made shorter in an accommodating position. Furthermore, since the exit pupil position needs to be sufficiently distant from the image plane, a zoom lens system of three-lens-group arrangement, including a negative lens group, a positive lens group, and a positive lens group, in this order from the object, is often utilized. Such three-lens-group zoom lens systems have been disclosed in, e.g., Japanese Unexamined Patent Publication Nos. Hei-10-213745 and Hei-10-170826. Applicant notes that Hei- 10-170826 is a family member of U.S. Pat. No. 6,124,984, which issued to Shibayama on Sep. 26, 2000.

Japanese Unexamined Patent Publication No. Hei-10-213745 has achieved miniaturization to a certain extent by reducing the number of lens elements; however, the front lens diameter and the overall length of the optical system with respect to the focal length is still large, so that adequate miniaturization is not achieved. Moreover, U.S. Pat. No. 6,124,984 teaches a telecentric optical system which achieves miniaturization; however, the optical system includes seven lens elements, which is relatively a large number of lens elements, so that the length of the optical system in the accommodating position becomes long, which increases the size of a camera. In a zoom lens system for a small camera having a telescoping lens barrel, the thickness of each lens group is required to be smaller, in addition to the front lens diameter and the overall length of the lens system which are required to be miniaturized in order to reduce the size of the camera body. Generally, if attempts are made to reduce the number of lens elements in order to miniaturize the lens system, and to reduce the thickness of the lens groups, the correcting of aberrations becomes more difficult. Accordingly, in order to adequately correct aberrations over the entire zooming range while achieving miniaturization, an appropriate refractive power distribution for each lens group and an appropriate lens arrangement are necessary.

SUMMARY OF THE INVENTION

The present invention provides a small telephoto three-lens-group zoom lens system for a digital camera having a wide-angle range such as a zoom ratio of about 2 to 3 (half angle of view of more than 30°).

The present invention also provides a zoom lens system which can reduce sensitivity on the deterioration of aberrations caused by decentration of a second lens group in the case of a three-lens-group arrangement in which the second lens group includes a single positive lens element having an aspherical surface on each surface thereof.

According to a first aspect of the present invention, there is provided a zoom lens system including a negative powered (hereinafter, negative) first lens group, a positive powered (hereinafter, positive) second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group increases. Furthermore, the zoom lens system satisfies the following conditions:

$$0.4 < (fw \cdot ft)^{1/2}/|f1| < 0.8 \ (f1 < 0) \tag{1}$$

$$0.7 < (fw \cdot ft)^{1/2}/f2 < 1.4 \tag{2}$$

$$0.4 < (fw \cdot ft)^{1/2}/f3 < 0.9 \tag{3}$$

wherein fw designates the focal length of the entire zoom lens system at the short focal length extremity;

ft designates the focal length of the entire zoom lens system at the long focal length extremity; and fi designates the focal length of the ith lens group (i=1~3).

The most image-side lens element of the positive second lens group preferably includes a lens element having a concave surface facing toward the image, and the lens element satisfies the following condition:

$$0.4 < Rs/fw < 0.8 \tag{4}$$

wherein

Rs designates the radius of curvature of the concave surface of the lens element.

The negative first lens group can include a negative lens element and a positive lens element, in this order from the object. The positive second lens group can include two positive lens elements and a negative lens element, in this order from the object. The positive third lens group can include a positive lens element.

The positive second lens group can include a positive lens element and two negative lens elements, in stead of two positive lens elements and a negative lens element. In this case, the positive second lens group preferably satisfies the following condition:

$$vs < 23 \tag{5}$$

wherein vs designates the Abbe number of the most image-side negative lens element in said positive second lens group.

In a second aspect of the present invention, there is provided a zoom lens system including a negative first lens group, a positive second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group increases.

The most image-side lens element of the positive second lens element includes a lens element having a concave surface facing toward the image, and the lens element satisfies the following condition:

$$0.4 < Rs/fw < 0.8 \quad (4)$$

wherein

Rs designates the radius of curvature of the concave surface of the lens element.

In a third aspect of the present invention, there is provided a zoom lens system including a negative first lens group, a positive second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group increases.

The positive second lens group includes a single positive lens element, and a single negative lens element or cemented lens elements which as a whole have a negative refractive power. The single positive lens element is provided with an aspherical surface on each surface thereof, and satisfies the following conditions:

$$0.6 < |\Delta I_{R1}/I_{R1}| < 1.4 \quad (6)$$

$$(\Delta I_{R1}/I_{R1} < 0)$$

$$0.6 < |\Delta I_{R2}/I_{R2}| < 1.4 \quad (7)$$

$$(\Delta I_{R2}/I_{R2} < 0)$$

wherein $\Delta I_{R1}$ designates the amount of change of the third-order spherical aberration coefficient due to the object-side aspherical surface of the single positive lens element with the aspherical surfaces under the condition that the focal length at the long focal length extremity is converted to 1.0; $I_{R1}$ designates the third-order spherical aberration coefficient due to the object-side paraxial spherical component of the single positive lens element with the aspherical surfaces when the focal length at the long focal length extremity is converted to 1.0;

$\Delta I_{R2}$ designates the amount of change of the third-order spherical aberration coefficient due to the image-side aspherical surface of the single positive lens element with the aspherical surfaces under the condition that the focal length at the long focal length extremity is converted to 1.0; and $I_{R2}$ designates the third-order spherical aberration coefficient due to the image-side paraxial spherical component of the single positive lens element with the aspherical surfaces when the focal length at the long focal length extremity is converted to 1.0.

In a fourth aspect of the present invention, there is provided a zoom lens system including a negative first lens group, a positive second lens group, and a positive third lens group, in this order from the object.

Upon zooming from the short focal length extremity to the long focal length extremity, the distance between the negative first lens group and the positive second lens group decreases, and the distance between the positive second lens group and the positive third lens group increases.

The positive second lens group includes a single positive lens element, and a single negative lens element or cemented lens elements which as a whole have a negative refractive power. The single positive lens element is provided with an aspherical surface on each surface thereof. The zoom lens system satisfies the following condition:

$$0.3 < LD_{2G}/LD_{3G-im} < 1.2 \quad (8)$$

wherein $LD_{2G}$ designates the distance along the optical axis from the most object-side surface of the positive second lens group to the most image-side surface thereof; and $LD_{3G-im}$ designates the minimum distance along the optical axis from the most object-side surface of the positive third lens group to the image plane over the entire zooming range.

Condition (8) is preferably satisfied in the third aspect of the present invention as well.

In either of the third and fourth aspects of the present invention, the negative first lens group preferably includes a negative lens element and a positive lens element, in this order from the object. The most image-side lens element can be provided with an aspherical surface on at least one surface thereof. The zoom lens system satisfies the following conditions:

$$0.5 < LD_{1g}/fw < 1.0 \quad (9)$$

$$1.75 < N_{asp}(1G) \quad (10)$$

wherein $LD_{1G}$ designates the distance along the optical axis from the most object-side surface of the negative first lens group to the most image-side surface thereof;

fw designates the focal length of the entire optical system at the short focal length extremity; and $N_{asp}(1G)$ designates the refractive index of the d-line of the most image-side lens element with the aspherical surface in the negative first lens group.

The present disclosure relates to subject matter contained in Japanese Patent Application No. 2002-118067 (filed on Apr. 19, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1 at the short focal length extremity;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIG. 5 is a lens arrangement of a zoom lens system according to a second embodiment of the present invention;

FIGS. 6A, 6B, 6C and 6D show aberrations occurred in the lens arrangement shown in FIG. 5 at the short focal length extremity;

FIG. 9 is a lens arrangement of a zoom lens system according to a third embodiment of the present invention;

FIGS. 10A, 10B, 10C and 10D show aberrations occurred in the lens arrangement shown in FIG. 9 at the short focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

FIG. 13 is a lens arrangement of a zoom lens system according to a fourth embodiment of the present invention;

FIGS. 14A, 14B, 14C and 14D show aberrations occurred in the lens arrangement shown in FIG. 13 at the short focal length extremity;

FIGS. 15A, 15B, 15C and 15D show aberrations occurred in the lens arrangement shown in FIG. 13 at an intermediate focal length;

FIGS. 16A, 16B, 16C and 16D show aberrations occurred in the lens arrangement shown in FIG. 13 at the long focal length extremity;

FIG. 17 is a lens arrangement of a zoom lens system according to a fifth embodiment of the present invention;

FIGS. 18A, 18B, 18C and 18D show aberrations occurred in the lens arrangement shown in FIG. 17 at the short focal length extremity;

FIGS. 19A, 19B, 19C and 19D show aberrations occurred in the lens arrangement shown in FIG. 17 at an intermediate focal length;

FIGS. 20A, 20B, 20C and 20D show aberrations occurred in the lens arrangement shown in FIG. 17 at the long focal length extremity.

FIGS. 23A, 23B, 23C and 23D show aberrations occurred in the lens arrangement shown in FIG. 21 at an intermediate focal length;

FIGS. 24A, 24B, 24C and 24D show aberrations occurred in the lens arrangement shown in FIG. 21 at the long focal length extremity;

FIG. 25 is a lens arrangement of a zoom lens system according to a seventh embodiment of the present invention;

FIGS. 26A, 26B, 26C and 26D show aberrations occurred in the lens arrangement shown in FIG. 25 at the short focal length extremity;

FIGS. 27A, 27B, 27C and 27D show aberrations occurred in the lens arrangement shown in FIG. 25 at an intermediate focal length;

FIGS. 28A, 28B, 28C and 28D show aberrations occurred in the lens arrangement shown in FIG. 25 at the long focal length extremity;

FIG. 29 is a lens arrangement of a zoom lens system according to an eighth embodiment of the present invention;

FIGS. 30A, 30B, 30C and 30D show aberrations occurred in the lens arrangement shown in FIG. 29 at the short focal length extremity;

FIGS. 31A, 31B, 31C and 31D show aberrations occurred in the lens arrangement shown in FIG. 29 at an intermediate focal length;

FIGS. 32A, 32B, 32C and 32D show aberrations occurred in the lens arrangement shown in FIG. 29 at the long focal length extremity;

FIGS. 35A, 35B, 35C and 35D show aberrations occurred in the lens arrangement shown in FIG. 33 at an intermediate focal length;

FIGS. 36A, 36B, 36C and 36D show aberrations occurred in the lens arrangement shown in FIG. 33 at the long focal length extremity.

DESCRIPTION OF THE PREFERRED EMBODIMENTS

Figure 37:
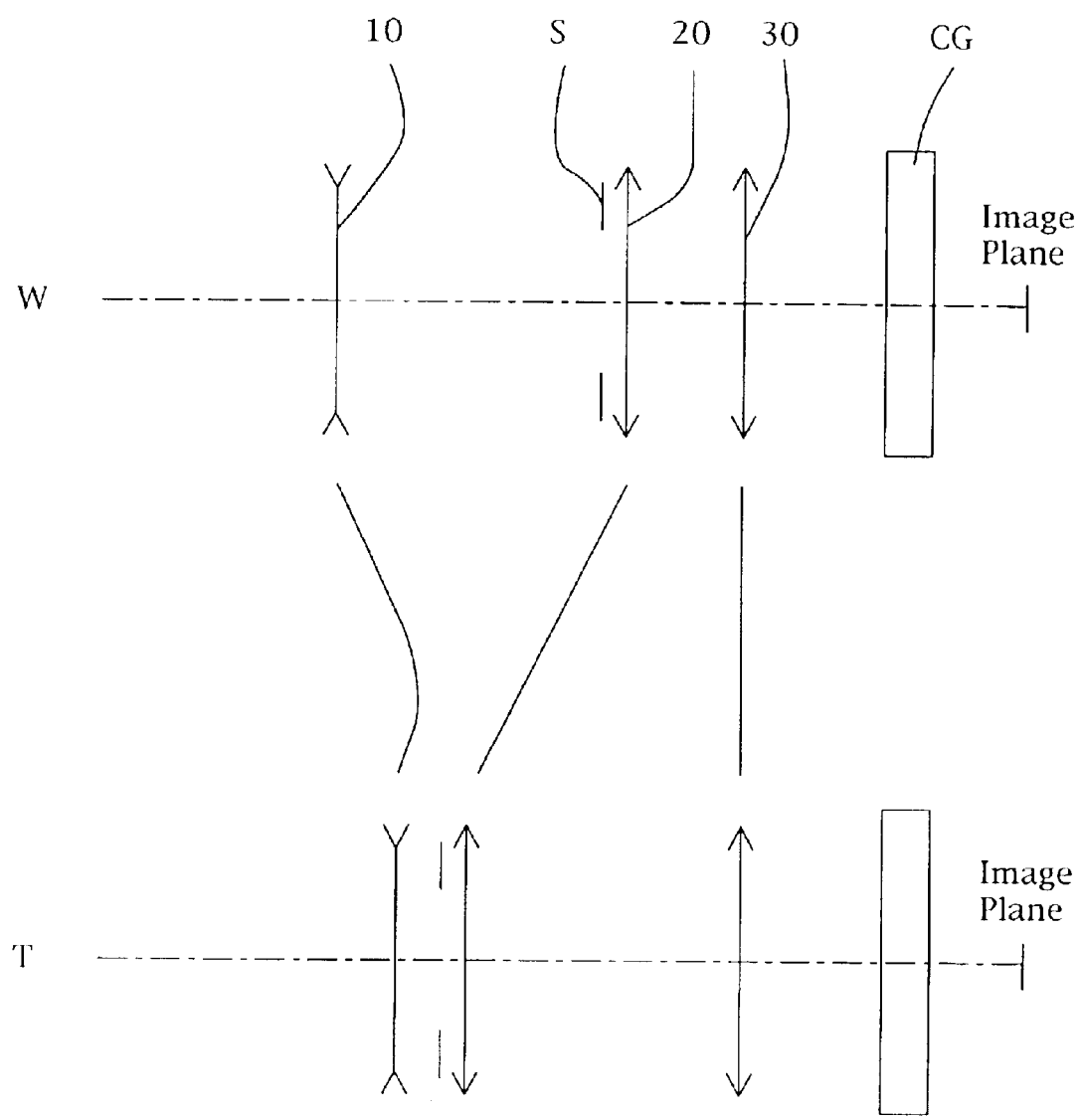
FIG. 37 shows a schematic lens-group moving paths of the zoom lens system according to the present invention.

The zoom lens system of the present invention, as shown in the schematic lens-group moving paths of FIG. 37, includes a negative first lens group 10, a diaphragm S, a positive second lens group 20, and a positive third lens group 30, in this order from the object. In the embodiments, the positive third lens group 30 includes a single lens element; however, the positive third lens group 30 can include a plurality of lens elements.

In this three-lens-group zoom lens system, upon zooming from the short focal length extremity (W) to the long focal length extremity (T), the distance between the negative first lens group 10 and the positive second lens group 20 decreases, and the distance between the positive second lens group 20 and the positive third lens group 30 increases. The diaphragm S moves together with the positive second lens group 20. Focusing is carried out by the negative first lens group 10. A symbol CG designates a cover glass (plane-parallel plate) for an infrared-cut filter group provided in front of an imaging device.

Condition (1) specifies the focal length range of the negative first lens group 10 with respect to an intermediate focal length $((fw \cdot ft)^{1/2})$.

If $(fw \cdot ft)^{1/2}/|f1|$ exceeds the lower limit of condition (1), the negative refractive power of the first lens group 10 becomes weaker, so that the back focal distance at the short focal length extremity cannot be sufficiently secured. Furthermore, it becomes difficult to obtain a wide viewing angle.

If the negative refractive power of the first lens group 10 becomes larger to the extent that $(fw \cdot ft)^{1/2}/|f1|$ exceeds the upper limit of condition (1), the refractive power of each lens group becomes stronger, so that the correcting of aberrations becomes difficult. Consequently, an adequate image-forming performance cannot be achieved. Furthermore, the back focal distance becomes longer. Consequently, the overall length of the zoom lens system also becomes longer.

Condition (2) specifies the focal length range of the positive second lens group 20 with respect to an intermediate focal length. The positive second lens group 20 is arranged to perform most of the zooming function of the zoom lens system. Accordingly, there is a need to determine an appropriate refractive power for the positive second lens group 20.

If the positive refractive power of the second lens group 20 becomes weaker to the extent that $(fw \cdot ft)^{1/2}/f2$ exceeds the lower limit of condition (2), the traveling distance of the positive second lens group 20 becomes longer in order to achieve a zoom ratio of about 3. As a result, the overall length of the zoom lens system becomes longer at the long focal length extremity.

If the positive refractive power of the positive second lens group 20 becomes stronger to the extent that $(fw \cdot ft)^{1/2}/f2$ exceeds the upper limit of condition (2), the refractive power of each lens group becomes stronger. Consequently, the correcting of aberrations becomes difficult, and adequate image-forming performance cannot be achieved.

Condition (3) specifies the focal length range of the positive third lens group 30 with respect to an intermediate focal length. The positive third lens group 30 functions to secure telecentricity by keeping the exit pupil position away from the image plane.

If $(fw \cdot ft)^{1/2}/f3$ exceeds the lower limit of condition (3), the positive refractive power of the positive third lens group 30 becomes weaker, so that the exit pupil position approaches the image plane at the short focal length extremity. Consequently, telecentricity cannot not be maintained.

If the positive refractive power of the positive third lens group 30 becomes stronger to the extent that $(fw \cdot ft)^{1/2}/f3$ exceeds the upper limit of condition (3), the positive refractive power of the second lens group 20 becomes relatively weaker, so that the overall length of the zoom lens system at the long focal length extremity becomes longer. Furthermore, field curvature and astigmatism at the long focal length extremity worsens, so that adequate image-forming performance cannot be achieved.

The most image-side lens element of the positive second lens group 20 preferably includes a lens element having a strong diverging function toward on the image, i.e., a concave surface facing toward the image; and the concave surface preferably satisfies condition (4).

Condition (4) specifies the range of the radius of curvature of the most image-side concave surface in the positive second lens group 20. By satisfying this condition, both miniaturization and telecentricity of the zoom lens system at the short focal length extremity can be achieved.

If the radius of curvature becomes smaller to the extent that Rs/fw exceeds the lower limit of condition (4), the overall length of the zoom lens system can be made shorter; however, the exit pupil position becomes too close to the image plane, so that telecentricity is lost.

If the radius of curvature becomes larger to the extent that Rs/fw exceeds the upper limit of condition (4), the distance between the positive second lens group 20 and the positive third lens group 30 becomes longer, so that the overall length of the zoom lens system becomes longer.

In order to reduce the length of the zoom lens system in the accommodating position, it is necessary to reduce the number of lens element in each lens group.

Specifically, the negative first lens group 10 can include a negative lens element and a positive lens element; the positive second lens group 20, which is arranged to perform most of the zooming function of the zoom lens system, can include two positive lens elements and one negative lens element; and the positive third lens group 30, which functions to secure telecentricity, can include one positive lens element.

Furthermore, if the positive second lens element of the negative first lens group 10 is provided with at least one aspherical surface, off-axis aberrations such as distortion, coma and astigmatism at the short focal length extremity can be sufficiently corrected. The positive second lens element having the aspherical surface can be made from either glass or plastic. In particular, if the positive second lens element is made from plastic, costs can be reduced.

In order to further reduce the length of the zoom lens system in the accommodating position, the positive second lens group 20 can alternatively include a positive lens element and a negative lens element, instead the above-described three-lens-element arrangement. In this two-lens-element arrangement, the refractive power of the positive lens element becomes stronger, so that it becomes difficult to reduce fluctuations of aberrations such as spherical aberration upon zooming. In this case, the positive lens element is preferably provided with at least one aspherical surface. On the other hand, if both surfaces of the positive lens element are provided with aspherical surfaces, spherical aberration and coma which fluctuate upon zooming can be reduced. Furthermore, the positive second lens group 20 of the two-lens-element arrangement preferably satisfies condition (5).

If vs exceeds the upper limit of condition (5), fluctuations in axial lateral chromatic aberrations upon zooming become larger, so that adequate image-forming performance cannot be achieved.

In addition to the above, if the most object-side positive lens element of the positive second lens group 20 is provided with an aspherical surface on at least one of the object-side surface and the image-side surface, a further improved image-forming performance can be achieved. More specifically, if the aspherical surface can be formed so that the positive refractive power becomes weaker toward the periphery of the most object-side positive lens element, fluctuations of spherical aberration can be reduced over the entire focal length range, and the correcting of come at the long focal length extremity can more suitably be made. The lens element with the aspherical surface can be made by either glass or plastic; however, the lens element is preferably formed by glass due to the strong refractive power of glass.

The most object-side positive lens element of the positive second lens group 20 preferably includes a positive lens element having an aspherical surface on each surface thereof. Namely, the positive second lens group 20 includes a single positive lens element 21, and a negative single lens element or cemented lens elements (22, 23) which as a whole have a negative refractive power. The aspherical surface is formed on each surface of the single positive lens element 21, and the aspherical surfaces satisfy conditions (6) and (7).

In other words, conditions (6) and (7) are for reducing sensitivity on deterioration of aberrations caused by decentration of the single positive lens element 21 with the aspherical surfaces, which mainly bears the positive refractive power of the second lens group 20. By satisfying these conditions, the single positive lens element 21 with the aspherical surfaces can be shaped so that on each surface, spherical aberration is cancelled out by providing a spherical portion to control spherical aberration and an aspherical portion thereof, which is substantially the same amount of the spherical portion, to control spherical aberration. Here, note that on each surface, the spherical portion and the aspherical portion are formed in the opposite directions along the optical axis.

As discussed above, a lens element which bears most of the refractive power of a lens group is arranged to have an aspherical surface on each surface thereof. Moreover, the aspherical surfaces can be utilized not only to correct aberration over the entire optical system, but also to reduce deterioration of aberrations due to decentration. It should be noted that no prior art has disclosed such an optical conception therein.

If $|\Delta I_{R1}/I_{R1}|$ and $|\Delta I_{R2}/I_{R2}|$ exceeds the upper or lower limit of conditions (6) and (7), it becomes possible, theoretically, to correct spherical aberration over the entire optical system, as a conventional aspherical lens element which is designed to correct aberrations over the entire optical system can; however, on each surface, the balance of the control on spherical aberration is lost, so that it becomes difficult to reduce deterioration of aberrations due to decentration. Consequently, decentration has to be controlled to become smaller by relying on precision on machining devices, which causes an increase on production costs.

On the other hand, in the case where (i) the positive second lens group 20 includes a single positive lens element 21, and a negative single lens element or cemented lens elements (22, 23) which as a whole have a negative refractive power, and (ii) an aspherical surface is provided on each surface of the single positive lens element 21, the single positive lens element 21 preferably satisfies condition (8), or satisfies condition (8) in addition to conditions (6) and (7).

Condition (8) specifies the ratio of the distance ($LD_{2G}$) to the distance ($LD_{3G-im}$). Namely, $LD_{2G}$ designates the distance along the optical axis from the most object-side surface of the positive second lens group 20 to the most image-side surface thereof; and $LD_{3G-im}$ designates the minimum distance along the optical axis from the most object-side surface of the positive third lens group 30 to the image plane over the entire zooming range.

In a camera where the positional relationship of lens groups in the photographing state (advanced position) is released in the non-photographing state (accommodating position) in order to make the accommodating length of the lens system shorter, a portion in a lens group which does not vary a distance between lens elements upon zooming has to be controlled with higher precision, compared with a portion in a lens group which varies a distance between lens elements upon zooming, when the lens system is moved from the accommodating position to the advanced position. This is because the portion in a lens group which does not vary a distance between lens elements upon zooming causes a large change in aberrations even due to a small error in the distance between lens elements. Moreover, it becomes difficult to provide a mechanism to materialize such a precise positional control for the lens elements.

Accordingly, in the photographing state (advanced position), the distances among the lens groups are allowed to be longer, because the distances among the lens groups can easily be made shorter in the non-photographing state (accommodating position). However, the thickness of a lens element and the distances thereamong in a lens group are preferably made smaller, because it is difficult or impossible to make these factors shorter in the non-photographing state (accommodating position).

On the other hand, in the case where the zoom lens system of the three-lens-group arrangement, i.e., the negative, positive and positive lens groups, according to the embodiments is provided as a suitable optical system with respect to an electronic imaging device of a digital camera or the like, the distance ($LD_{3G-im}$) along the optical axis from the most object-side surface of the positive third lens group 30 to the image plane cannot theoretically be made shorter in order to secure telecentricity to some extent with respect to the image plane. Furthermore, a lens group closer to the image plane generally has a large diameter. Therefore in the case of a camera where lens groups are retracted in the accommodating position in a manner that at least one lens group is deviated from the optical axis and stored in an upper accommodating position with respect to the rest of the lens groups in a lower accommodating position, the height of the camera in a vertical direction undesirably increases.

In order to eliminate the drawback described above, the positive second lens group 20 includes a single positive lens element 21, and a negative single lens element or cemented lens elements (22, 23) which as a whole have a negative refractive power; and an aspherical surface is provided on each surface of the single positive lens element 21. Due to such an arrangement, the distance ($LD_{2G}$) along the optical axis from the most object-side surface of the positive second lens group 20 to the most image-side surface thereof can be made shorter with respect to the distance ($LD_{3G-im}$) along the optical axis from the most object-side surface of the positive third lens group 30 to the image plane over the entire zooming range. Specifically, the distance ($LD_{2G}$) can be made shorter to the extent that the distance ($LD_{2G}$)is about 1.2 times longer than the distance ($LD_{3G-im}$). Due to this arrangement, the positive second lens group 20 can sufficiently correct aberrations in the photographing state (advanced position), while the accommodating length of the lens system can be made shorter in the non-photographing state (accommodating position). In addition, since the diameter of the positive second lens group 20 is relatively smaller, the height of a camera in a vertical direction can be made shorter even in the case where the lens groups are accommodated in the upper and lower accommodating positions.

If $LD_{2G}/LD_{3G-im}$ exceeds the lower limit of condition (8), the number of lens elements of the positive second lens group 20 is substantially limited to one or two. Consequently, it becomes difficult to secure the number of lens elements necessary for the correcting of aberrations. On the other hand, if the number of aspherical surfaces is increased, the correcting of aberrations can theoretically be possible with a smaller number of lens element. However, if such an attempt is made, extremely high precision, which cannot be satisfied in mass production, is required.

If $LD_{2G}/LD_{3G-im}$ exceeds the upper limit of condition (8), it becomes easy to correct aberrations in the positive second lens group 20 by increasing the number of lens elements therein; however, due to this increase of the lens elements in the positive second lens group 20, and the effects on the reduction of the distances among lens elements in the non-photographing state (accommodating position) cannot be expected, so that the camera cannot be miniaturized.

In order to shorten the accommodating length of the lens system, the number of lens elements in the negative first lens group 10 is preferably reduced to the minimum by which aberrations can still be corrected suitably. In addition to providing an aspherical surface on at least one surface of a lens element to reduce the number of lens elements, a glass material having a high refractive index, e.g., preferably more than 1.75, or more preferably more than 1.8, can be employed. Due to the above arrangement, the radius of curvature of each surface can be made larger, while the thickness of the negative first lens group 10 and the diameter thereof can be both made smaller.

Condition (9) specifies the distance along the optical axis from the most object-side surface of the negative first lens group 10 to the image plane by normalizing the focal length of the entire optical system at the short focal length extremity, and determines a preferable range of the distance from the most object-side surface of the negative first lens group to the image plane.

If $LD_{1G}/fw$ exceeds the lower limit of condition (9), it becomes necessary to increase the number of aspherical surfaces, while the number of lens elements is reduced, in order to sufficiently correct aberrations. Such an arrangement may theoretically be possible; however, providing many aspherical surfaces in the optical system causes an increase of sensitivity on production errors, which causes difficulties in obtaining preferable optical performance.

If $LD_{1G}/fw$ exceeds the upper limit of condition (9), the correcting of aberrations becomes easier; however, the accommodating length of the lens system cannot sufficiently be made shorter.

Condition (10) specifies the refractive index of the d-line of the image-side lens element, in the negative first lens group 10, on which the aspherical surface is formed.

If $N_{asp}(1G)$ exceeds the lower limit of condition (10), the radius of curvature of the image-side lens element becomes smaller. Consequently, the only one aspherical surface is not enough to correct aberrations occurred in the negative first lens group 10.

In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, Nd designates the refractive index of the d-line, and vd designates the Abbe number.

In the embodiments, the plane-parallel plate (Surface Nos. 12 and 13) includes a filter group such as a cover glass, a low pass filter or the like; and these elements can optically be positioned anywhere between the most image-side lens element and the image plane.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

The relationship between the aspherical coefficients and aberration coefficients are as follows:

1. The shape of an aspherical surface is defined as follows:

$$x=cy^2/(1+[1-\{1+K\}c^2y^2]^{1/2})+A4y^4+A6y^6+A8y^8+A10y^{10}$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).

$B4=A4+Kc^3/8$;
$B6=A6+(K^2+2K)c^5/16$;
$B8=A8+5(K^3+3K^2+3K)c^7/128$
$B10=A10+7(K^4+4K^3+6K^2+4K)c^9/256$; and therefore, the following equation is obtained:

$$x=cy^2/[1+[1-c^2y^2]^{1/2}]+B4y^4+B6y^6+B8y^8+B10y^{10+}$$

3. Furthermore, in order to normalize the focal length f to 1.0, the followings are considered:

$$X=x/f;\ Y=y/f;\ C=f\times c;$$

$$\alpha 4=f^3 B4;\ \alpha 6=f^5 B6;\ \alpha 8=f^7 B8;\ \alpha 10=f^9 B10$$

Accordingly, the following equation is obtained.

$$X=CY^2/[1+[1-C^2Y^2]^{1/2}]+\alpha 4Y^4+\alpha 6Y^6+\alpha 8Y^8+\alpha 10Y^{13+}$$

4. $\Phi=8\ (N'-N)\alpha 4$ is defined, and the third aberration coefficients are defined as follows:
I designates the spherical aberration coefficient;
II designates the coma coefficient;
III designates the astigmatism coefficient;
IV designates the curvature coefficient of the sagittal image surface; and
V designates the distortion coefficient; and therefore, the influence of the fourth-order aspherical-surface coefficient ($\alpha 4$) on each aberration coefficient is defined as:

$$\Delta I=h^4\Phi$$

$$\Delta II=h^3 k\Phi$$

$$\Delta III=h^2 k^2\Phi$$

$$\Delta IV=h^2 k^2\Phi$$

$$\Delta V=hk^3\Phi$$

wherein
h1 designates the height at which a paraxial axial light ray strikes the first surface of the lens system including the aspherical surface;
h designates the height at which the paraxial axial light ray strikes the aspherical surface when the height h1 is 1;
k1 designates the height at which a paraxial off-axis ray, passing through the center of the entrance pupil, strikes the first surface of the lens system including the aspherical surface;
k designates the height at which the paraxial off-axis light ray strikes the aspherical surface when the height k1 is −1;

N' designates the refractive index of a medium on the side of the image with respect to the aspherical surface; and
N designates the refractive index of a medium on the side of the object with respect to the aspherical surface.

[Embodiment 1]

FIG. 1 is the lens arrangement of the zoom lens system according to the first embodiment. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical data of the first embodiment.

The negative first lens group 10 includes a negative lens element 11 and a positive lens element 12, in this order from the object. The positive second lens group 20 includes a positive lens element 21, and cemented lens elements having a positive lens element 22 and a negative lens element 23, in this order from the object. The positive third lens group 30 includes a positive lens element. CG designates a cover glass (filter group) which is positioned in front (on the object side) of an imaging device. The diaphragm S is provided 0.7 in front (on the object side) of lens surface No. 5 (of positive lens element 21), and moves together with the positive second lens group 20 upon zooming.

TABLE 1

$F_{NO.} = 1:2.7–3.3–5.0$
f = 6.00–9.00–17.20 (Zoom Ratio = 2.87)
W = 31.1–21.4–11.6
fB = 0.00–0.00–0.00

| Surf. No. | r | d | Nd | vd |
|---|---|---|---|---|
| 1 | 153.464 | 0.80 | 1.83481 | 42.7 |
| 2 | 8.401 | 2.11 | — | — |
| 3* | 23.276 | 2.70 | 1.82529 | 24.2 |
| 4* | −344.546 | 20.98–12.00–3.45 | — | — |
| 5 | 14.019 | 1.97 | 1.72916 | 54.7 |
| 6 | −24.443 | 0.10 | — | — |
| 7 | 5.308 | 2.83 | 1.48749 | 70.2 |
| 8 | −9.640 | 1.80 | 1.64769 | 33.8 |
| 9 | 3.699 | 2.50–5.62–14.15 | — | — |
| 10 | 17.793 | 2.50 | 1.69680 | 55.5 |
| 11 | −18.179 | 3.20 | — | — |
| 12 | ∞ | 2.01 | 1.51633 | 64.1 |
| 13 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.95196 \times 10^{-4}$ | $0.15000 \times 10^{-5}$ | $0.63042 \times 10^{-7}$ |
| 4 | 0.00 | $-0.23511 \times 10^{-3}$ | $0.29362 \times 10^{-5}$ | 0.00 |

[Embodiment 2]

FIG. 5 is the lens arrangement of the zoom lens system according to the second embodiment. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment.

The basic lens arrangement of the second embodiment is the same as the first embodiment. The diaphragm S is provided 0.67 in front (on the object side) of lens surface No. 5 (of positive lens element 21), and moves together with the positive second lens group 20 upon zooming.

TABLE 2

$F_{NO.} = 1:2.8–3.2–4.3$
f = 5.40–7.00–10.80 (Zoom Ratio = 2.00)
W = 32.7–25.5–16.8
fB = 0.34–0.34–0.34

| Surf. No. | r | d | Nd | vd |
|---|---|---|---|---|
| 1 | 100.000 | 1.00 | 1.77250 | 49.6 |
| 2 | 5.042 | 1.81 | — | — |
| 3 | 17.702 | 1.80 | 1.80518 | 25.4 |
| 4* | −743.297 | 9.35–6.39–2.88 | — | — |
| 5* | 5.251 | 1.79 | 1.58913 | 61.2 |
| 6 | −12.603 | 0.20 | — | — |
| 7 | 6.893 | 1.35 | 1.83481 | 42.7 |
| 8 | 13.571 | 0.80 | 1.84666 | 23.8 |
| 9 | 3.252 | 3.63–5.39–9.59 | — | — |
| 10 | 33.574 | 2.05 | 1.58913 | 61.2 |
| 11* | −10.021 | 1.00 | — | — |
| 12 | ∞ | 1.50 | 1.51633 | 64.1 |
| 13 | ∞ | 0.50 | — | — |
| 14 | ∞ | 0.50 | 1.51633 | 64.1 |
| 15 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 4 | 0.00 | $-0.56650 \times 10^{-3}$ | $0.15992 \times 10^{-5}$ | $-0.81846 \times 10^{-6}$ |
| 5 | 0.00 | $-0.13781 \times 10^{-2}$ | $-0.24555 \times 10^{-4}$ | 0.00 |
| 11 | 0.00 | $0.54022 \times 10^{-3}$ | $-0.89341 \times 10^{-5}$ | 0.00 |

[Embodiment 3]

FIG. 9 is the lens arrangement of the zoom lens system according to the third embodiment. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical data of the third embodiment.

The basic lens arrangement of the third embodiment is the same as the first embodiment except that the positive second lens group 20 includes a positive lens element 21 and a negative meniscus lens element 22 having the concave surface facing toward the image, in this order from the object. The diaphragms is provided 0.7 in front (on the object side) of lens surface No. 5 (of positive lens element 21), and moves together with the positive second lens group 20 during zooming.

TABLE 3

$F_{NO.} = 1:2.7–3.6–5.2$
f = 7.25–12.10–20.64 (Zoom Ratio = 2.85)
W = 32.9–20.4–12.3
fB = 0.00–0.00–0.00

| Surf. No. | r | d | Nd | vd |
|---|---|---|---|---|
| 1 | 51.813 | 0.90 | 1.77250 | 49.6 |
| 2 | 7.251 | 2.72 | — | — |
| 3* | 20.298 | 2.40 | 1.80518 | 25.4 |
| 4* | 83.771 | 16.95–8.15–2.70 | — | — |

TABLE 3-continued $F_{NO.}$ = 1:2.7–3.6–5.2
f = 7.25–12.10–20.64 (Zoom Ratio = 2.85)
W = 32.9–20.4–12.3
fB = 0.00–0.00–0.00

| Surf. No. | r | d | Nd | νd |
|---|---|---|---|---|
| 5* | 7.327 | 2.50 | 1.72916 | 54.7 |
| 6* | −18.987 | 0.10 | — | — |
| 7 | 16.947 | 3.73 | 1.92286 | 21.3 |
| 8 | 4.634 | 4.80–9.64–18.17 | — | — |
| 9 | 23.922 | 2.80 | 1.72916 | 54.7 |
| 10 | −24.519 | 2.73 | — | — |
| 11 | ∞ | 1.51 | 1.51633 | 64.1 |
| 12 | ∞ | 0.50 | — | — |
| 13 | ∞ | 0.50 | 1.51633 | 64.1 |
| 14 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | −0.27398 × $10^{-4}$ | −0.14171 × $10^{-5}$ | 0.88000 × $10^{-7}$ |
| 4 | 0.00 | −0.21862 × $10^{-3}$ | 0.51925 × $10^{-6}$ | 0.00 |
| 5 | 0.00 | −0.32331 × $10^{-3}$ | −0.54123 × $10^{-5}$ | 0.99049 × $10^{-7}$ |
| 6 | 0.00 | 0.28664 × $10^{-3}$ | −0.47358 × $10^{-5}$ | 0.68722 × $10^{-7}$ |

[Embodiment 4]

FIG. 13 is the lens arrangement of the zoom lens system according to the fourth embodiment. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical data of the fourth embodiment.

The basic lens arrangement of the fourth embodiment is the same as the third embodiment. The diaphragm S is provided 0.7 in front (on the object side) of lens surface No. 5 (of positive lens element 21), and moves together with the positive second lens group 20 upon zooming.

TABLE 4

$F_{NO.}$ = 1:2.7–3.4–5.3
f = 8.00–12.50–24.03 (Zoom Ratio = 3.00)
W = 30.4–19.8–10.6
fB = 0.00–0.00–0.00

| Surf. No. | r | d | Nd | νd |
|---|---|---|---|---|
| 1 | 35.725 | 0.90 | 1.83481 | 42.7 |
| 2 | 7.646 | 2.17 | — | — |
| 3* | 13.231 | 2.40 | 1.84666 | 23.8 |
| 4* | 25.272 | 17.99–9.74–2.70 | — | — |
| 5* | 7.110 | 2.50 | 1.77250 | 49.6 |
| 6 | −28.219 | 0.20 | — | — |
| 7* | 18.266 | 3.50 | 1.92286 | 21.3 |
| 8 | 4.880 | 4.92–8.97–19.37 | — | — |
| 9 | 30.098 | 2.80 | 1.69680 | 55.5 |
| 10 | −21.514 | 2.95 | — | — |
| 11 | ∞ | 1.51 | 1.51633 | 64.1 |
| 12 | ∞ | 0.50 | — | — |
| 13 | ∞ | 0.50 | 1.51633 | 64.1 |
| 14 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | −0.88427 × $10^{-4}$ | −0.16679 × $10^{-5}$ | 0.43529 × $10^{-7}$ |
| 4 | 0.00 | −0.23870 × $10^{-3}$ | −0.62834 × $10^{-6}$ | 0.00 |
| 5 | 0.00 | −0.11983 × $10^{-3}$ | −0.25840 × $10^{-5}$ | 0.00 |
| 7 | 0.00 | −0.45509 × $10^{-3}$ | −0.86460 × $10^{-5}$ | 0.16360 × $10^{-6}$ |

[Embodiment 5]

FIG. 17 is the lens arrangement of the zoom lens system according to the fifth embodiment. FIGS. 18A through 18D show aberrations occurred in the lens arrangement shown in FIG. 17 at the short focal length extremity. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows the numerical data of the fifth embodiment.

The basic lens arrangement of the fifth embodiment is the same as the third embodiment. The diaphragm S is provided 0.67 in front (on the object side) of lens surface No. 5 (of positive lens element 21), and moves together with the positive second lens group 20 upon zooming.

TABLE 5

$F_{NO.}$ = 1:2.7–3.5–4.8
f = 5.70–9.00–14.30 (Zoom Ratio = 2.51)
W = 32.9–21.7–14.1
fB = 2.70–2.70–2.70

| Surf. No. | r | d | Nd | νd |
|---|---|---|---|---|
| 1 | 16.171 | 0.90 | 1.77250 | 49.6 |
| 2 | 4.553 | 1.70 | — | — |
| 3* | 8.879 | 1.60 | 1.84666 | 23.8 |
| 4* | 13.209 | 11.05–6.14–3.00 | — | — |
| 5* | 4.433 | 2.00 | 1.69350 | 53.2 |
| 6* | −18.477 | 0.20 | — | — |
| 7 | 7.137 | 1.00 | 1.92286 | 21.3 |
| 8 | 3.193 | 3.14–6.99–13.17 | — | — |
| 9 | 75.707 | 2.00 | 1.58913 | 61.2 |
| 10 | −10.659 | 0.80 | — | — |
| 11 | ∞ | 1.50 | 1.51633 | 64.1 |
| 12 | ∞ | 0.50 | — | — |
| 13 | ∞ | 0.50 | 1.51633 | 64.1 |
| 14 | ∞ | — | — | — |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.83561 \times 10^{-3}$ | $0.22557 \times 10^{-4}$ | $-0.78955 \times 10^{-6}$ |
| 4 | 0.00 | $-0.16518 \times 10^{-2}$ | $0.38674 \times 10^{-4}$ | $-0.24551 \times 10^{-5}$ |
| 5 | 0.00 | $-0.12186 \times 10^{-2}$ | $-0.15219 \times 10^{-4}$ | 0.00 |
| 6 | 0.00 | $0.82006 \times 10^{-3}$ | $0.20843 \times 10^{-4}$ | 0.00 |

[Embodiment 6]

Figure 7A:
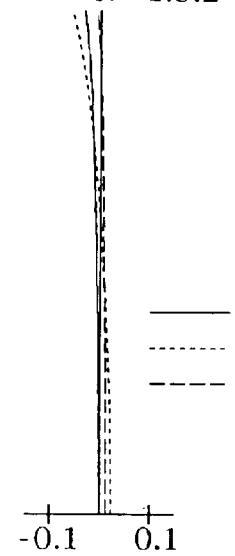
FIGS. 7A, 7B, 7C and 7D show aberrations occurred in the lens arrangement shown in FIG. 5 at an intermediate focal length.
Figure 7B:
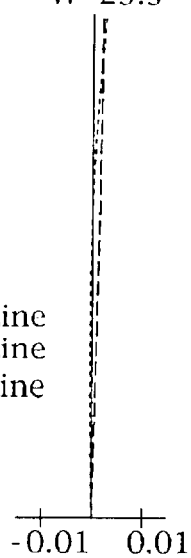
Figure 7C:
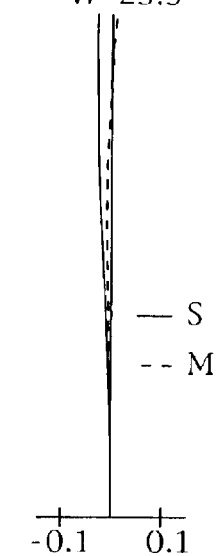
Figure 7D:
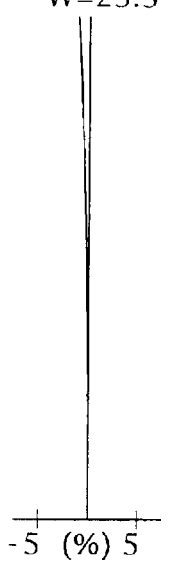
Figure 8A:
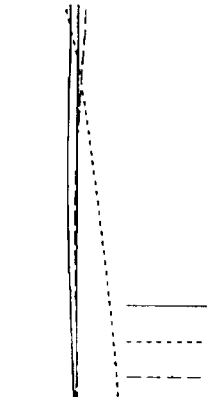
FIGS. 8A, 8B, 8C and 8D show aberrations occurred in the lens arrangement shown in FIG. 5 at the long focal length extremity.
Figure 8B:
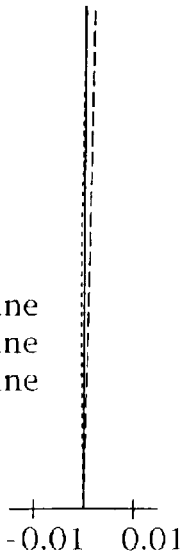
Figure 8C:
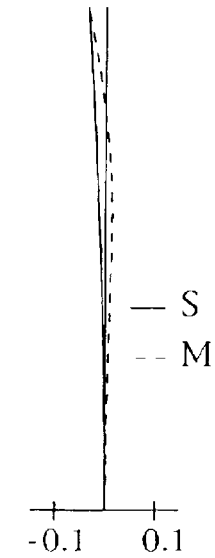
Figure 8D:
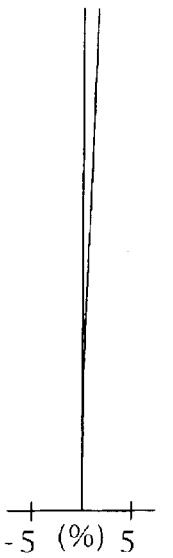
Figure 21:
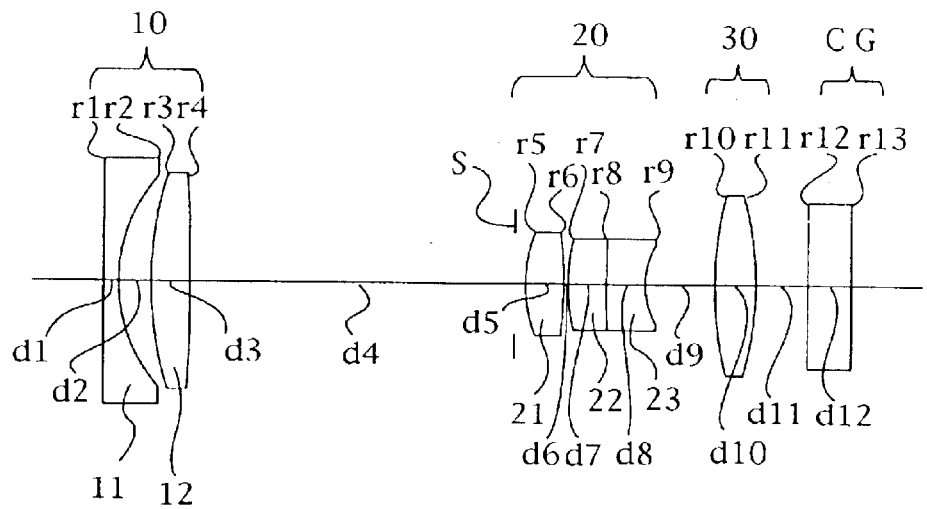
FIG. 21 is a lens arrangement of a zoom lens system according to a sixth embodiment of the present invention.
Figure 22A:
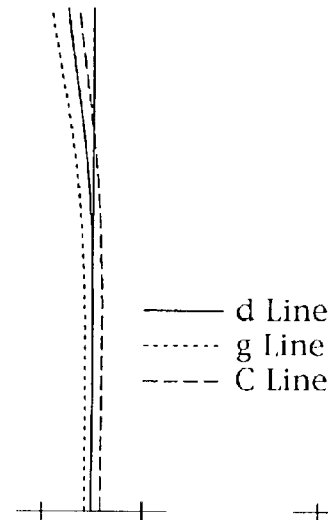
FIGS. 22A, 22B, 22C and 22D show aberrations occurred in the lens arrangement shown in FIG. 21 at the short focal length extremity.
Figure 22B:
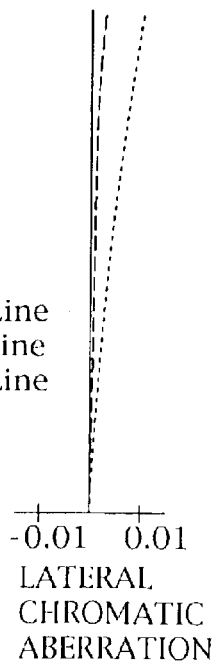
Figure 22C:
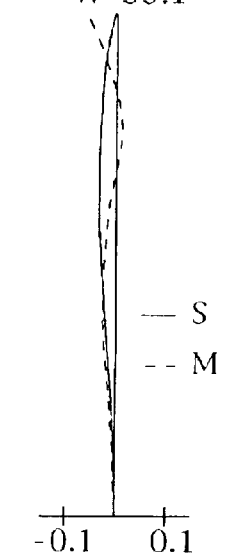
Figure 22D:
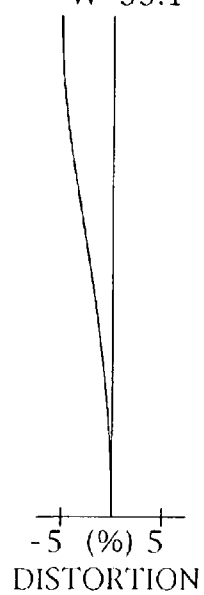

FIG. 21 is the lens arrangement of a zoom lens system according to the sixth embodiment of the present invention. FIGS. 22A through 22D show aberrations occurred in the lens arrangement shown in FIG. 21 at the short focal length extremity. FIGS. 23A through 23D show aberrations occurred in the lens arrangement shown in FIG. 21 at an intermediate focal length. FIGS. 24A through 24D show aberrations occurred in the lens arrangement shown in FIG. 21 at the long focal length extremity. Table 6 shows the numerical data of the sixth embodiment.

The basic lens arrangement of the sixth embodiment is the same as the first embodiment. The diaphragm S is provided 0.50 in front (on the object side) of lens surface No. 5 (of positive lens element 21), and moves together with the positive second lens group 20 upon zooming.

TABLE 6

$F_{NO.} = 1:2.7-3.5-5.3$
f = 5.80–9.60–17.40 (Zoom Ratio = 3.0)
W = 33.1–20.7–11.8
fB = 0.00–0.00–0.00

| Surf. No. | r | d | Nd | vd |
|---|---|---|---|---|
| 1 | 1070.671 | 0.70 | 1.88300 | 40.8 |
| 2 | 7.320 | 1.50 | — | — |
| 3* | 15.066 | 1.80 | 1.84666 | 23.8 |
| 4* | 209.571 | 15.54–7.68–2.28 | — | — |
| 5* | 6.208 | 1.80 | 1.58913 | 61.2 |
| 6* | −16.525 | 0.20 | — | — |
| 7 | 9.199 | 1.80 | 1.83400 | 37.2 |
| 8 | 48.765 | 1.80 | 1.84666 | 23.8 |
| 9 | 3.565 | 3.20–6.92–14.19 | — | — |
| 10 | 16.660 | 1.90 | 1.65160 | 58.5 |
| 11 | −15.068 | 2.40–2.27–2.02 | — | — |
| 12 | ∞ | 2.00 | 1.51633 | 64.1 |
| 13 | ∞ | | | |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.35482 \times 10^{-3}$ | $0.87922 \times 10^{-5}$ | $0.13000 \times 10^{-6}$ |
| 4 | 0.00 | $-0.56988 \times 10^{-3}$ | $0.12255 \times 10^{-4}$ | $-0.72152 \times 10^{-7}$ |
| 5 | 0.00 | $-0.55966 \times 10^{-3}$ | $-0.51644 \times 10^{-5}$ | $0.63694 \times 10^{-6}$ |
| 6 | 0.00 | $0.33682 \times 10^{-3}$ | $-0.13588 \times 10^{-4}$ | $0.18616 \times 10^{-5}$ |

[Embodiment 7]

FIG. 25 is the lens arrangement of a zoom lens system according to the seventh embodiment of the present invention. FIGS. 26A through 26D show aberrations occurred in the lens arrangement shown in FIG. 25 at the short focal length extremity. FIGS. 27A through 27D show aberrations occurred in the lens arrangement shown in FIG. 25 at an intermediate focal length. FIGS. 28A through 28D show aberrations occurred in the lens arrangement shown in FIG. 25 at the long focal length extremity. Table 7 shows the numerical data of the seventh embodiment.

The basic lens arrangement of the seventh embodiment is the same as the first embodiment. The diaphragm S is provided 0.50 in front (on the object side) of lens surface No. 5 (of positive lens element 21), and moves together with the positive second lens group 20 upon zooming.

TABLE 7

$F_{NO.} = 1:2.7-3.5-5.3$
f = 5.80–9.60–17.40 (Zoom Ratio = 3.0)
W = 33.1–20.7–11.8
fB = 0.00–0.00–0.00

| Surf. No. | r | d | Nd | vd |
|---|---|---|---|---|
| 1 | 382.810 | 0.70 | 1.83481 | 42.7 |
| 2 | 7.176 | 1.70 | — | — |
| 3* | 15.602 | 1.80 | 1.84666 | 23.8 |
| 4* | 107.333 | 15.63–7.71–2.28 | — | — |
| 5* | 6.230 | 1.80 | 1.58913 | 61.2 |
| 6* | −16.478 | 0.20 | — | — |
| 7 | 9.421 | 1.80 | 1.80610 | 40.9 |
| 8 | −610.289 | 1.80 | 1.80518 | 25.4 |
| 9 | 3.559 | 3.29–7.00–14.23 | — | — |
| 10 | 21.153 | 1.90 | 1.69350 | 53.2 |
| 11 | −14.800 | 2.46–2.31–2.01 | — | — |
| 12 | ∞ | 2.00 | 1.51633 | 64.1 |
| 13 | ∞ | | | |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.28796 \times 10^{-3}$ | $0.61541 \times 10^{-5}$ | $0.13000 \times 10^{-6}$ |
| 4 | 0.00 | $-0.51128 \times 10^{-3}$ | $0.10043 \times 10^{-4}$ | $-0.65399 \times 10^{-7}$ |
| 5 | 0.00 | $-0.55647 \times 10^{-3}$ | $-0.76617 \times 10^{-5}$ | $0.16838 \times 10^{-6}$ |
| 6 | 0.00 | $0.33457 \times 10^{-3}$ | $-0.16056 \times 10^{-4}$ | $0.12308 \times 10^{-5}$ |

[Embodiment 8]

FIG. 29 is the lens arrangement of a zoom lens system according to the eighth embodiment of the present invention. FIGS. 30A through 30D show aberrations occurred in the lens arrangement shown in FIG. 29 at the short focal length extremity. FIGS. 31A through 31D show aberrations occurred in the lens arrangement shown in FIG. 29 at an intermediate focal length. FIGS. 32A through 32D show aberrations occurred in the lens arrangement shown in FIG. 29 at the long focal length extremity. Table 8 shows the numerical data of the eighth embodiment.

The basic lens arrangement of the eighth embodiment is the same as the first embodiment. The diaphragm S is provided 0.50 in front (on the object side) of lens surface No. 5 (of positive lens element 21), and moves together with the positive second lens group 20 upon zooming.

TABLE 8

$F_{NO.} = 1:2.7-3.5-5.3$
f = 5.80–9.60–17.40 (Zoom Ratio = 3.0)
W = 32.8–20.6–11.7
fB = 0.00–0.00–0.00

| Surf. No. | r | d | Nd | vd |
|---|---|---|---|---|
| 1 | −4107.780 | 0.70 | 1.83481 | 42.7 |
| 2 | 6.869 | 1.70 | — | — |
| 3* | 16.029 | 1.80 | 1.76182 | 26.5 |
| 4* | −172.777 | 15.81–7.78–2.27 | — | — |
| 5* | 6.254 | 1.80 | 1.58913 | 61.2 |
| 6* | −17.193 | 0.20 | — | — |

TABLE 8-continued $F_{NO.} = 1:2.7-3.5-5.3$
f = 5.80–9.60–17.40 (Zoom Ratio = 3.0)
W = 32.8–20.6–11.7
fB = 0.00–0.00–0.00

| Surf. No. | r | d | Nd | νd |
|---|---|---|---|---|
| 7 | 9.513 | 1.80 | 1.80610 | 40.9 |
| 8 | 230.417 | 1.80 | 1.80518 | 25.4 |
| 9 | 3.599 | 3.31–7.19–14.62 | — | — |
| 10* | 19.495 | 1.90 | 1.69350 | 53.2 |
| 11 | −16.655 | 2.61–2.41–2.02 | — | — |
| 12 | ∞ | 2.00 | 1.51633 | 64.1 |
| 13 | ∞ | | | |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.17856 \times 10^{-3}$ | $0.67897 \times 10^{-5}$ | $0.13000 \times 10^{-6}$ |
| 4 | 0.00 | $-0.46540 \times 10^{-3}$ | $0.10007 \times 10^{-4}$ | $-0.12476 \times 10^{-6}$ |
| 5 | 0.00 | $-0.53913 \times 10^{-3}$ | $0.34168 \times 10^{-6}$ | $-0.27454 \times 10^{-6}$ |
| 6 | 0.00 | $0.31635 \times 10^{-3}$ | $-0.58681 \times 10^{-5}$ | $0.54646 \times 10^{-6}$ |
| 10 | 0.00 | $-0.71737 \times 10^{-4}$ | $0.39760 \times 10^{-5}$ | $-0.62015 \times 10^{-7}$ |

[Embodiment 9]

Figure 33:
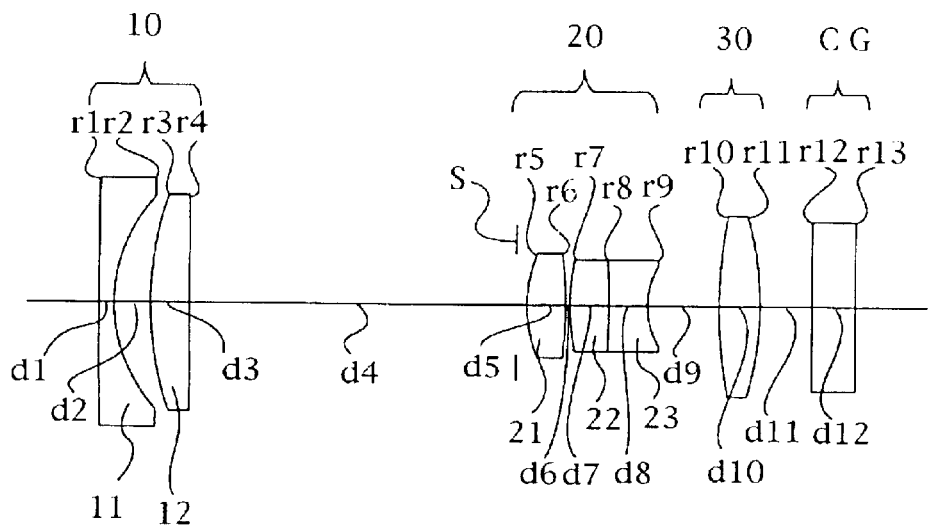
FIG. 33 is a lens arrangement of a zoom lens system according to a ninth embodiment of the present invention.
Figure 34A:
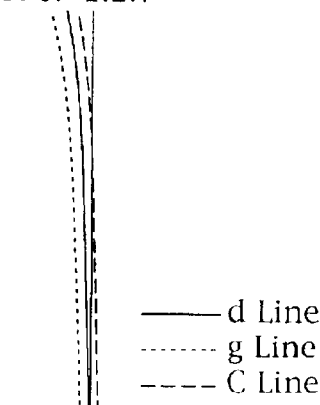
FIGS. 34A, 34B, 34C and 34D show aberrations occurred in the lens arrangement shown in FIG. 33 at the short focal length extremity.
Figure 34B:
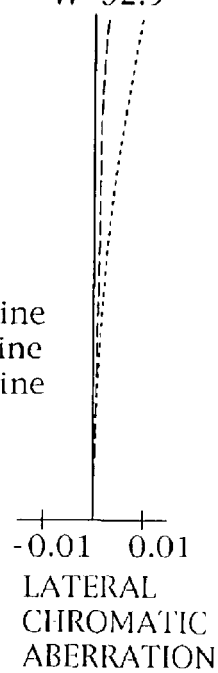
Figure 34C:
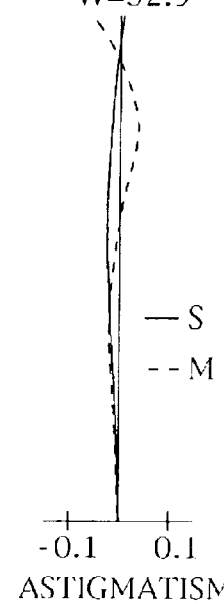
Figure 34D:
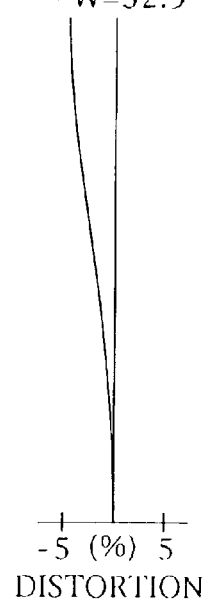

FIG. 33 is the lens arrangement of a zoom lens system according to the ninth embodiment of the present invention. FIGS. 34A through 34D show aberrations occurred in the lens arrangement shown in FIG. 33 at the short focal length extremity. FIGS. 35A through 35D show aberrations occurred in the lens arrangement shown in FIG. 33 at an intermediate focal length. FIGS. 36A through 36D show aberrations occurred in the lens arrangement shown in FIG. 33 at the long focal length extremity. Table 9 shows the numerical data of the ninth embodiment.

The basic lens arrangement of the ninth embodiment is the same as the first embodiment. The diaphragm S is provided 0.50 in front (on the object side) of lens surface No. 5 (of positive lens element 21), and moves together with the positive second lens group 20 upon zooming.

TABLE 9

$F_{NO.} = 1:2.7-3.5-5.3$
f = 5.80–9.60–17.40 (Zoom Ratio = 3.0)
W = 32.9–20.6–11.7
fB = 0.00–0.00–0.00

| Surf. No. | r | d | Nd | νd |
|---|---|---|---|---|
| 1 | 268.330 | 0.70 | 1.80400 | 46.6 |
| 2 | 7.096 | 1.70 | — | — |
| 3* | 14.686 | 1.80 | 1.80518 | 25.4 |
| 4* | 72.515 | 15.67–7.80–2.40 | — | — |
| 5* | 6.007 | 1.80 | 1.58313 | 59.4 |
| 6* | −17.088 | 0.20 | — | — |
| 7 | 9.924 | 1.80 | 1.83400 | 37.2 |
| 8 | −32.841 | 1.80 | 1.80518 | 25.4 |
| 9 | 3.576 | 3.31–7.03–14.18 | — | — |
| 10* | 20.607 | 1.90 | 1.69350 | 53.2 |
| 11 | −14.899 | 2.41–2.21–1.84 | — | — |
| 12 | ∞ | 2.00 | 1.51633 | 64.1 |
| 13 | ∞ | | | |

*designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| 3 | 0.00 | $-0.29267 \times 10^{-3}$ | $0.78926 \times 10^{-5}$ | $0.13000 \times 10^{-6}$ |
| 4 | 0.00 | $-0.52191 \times 10^{-3}$ | $0.12010 \times 10^{-4}$ | $-0.69884 \times 10^{-7}$ |
| 5 | 0.00 | $-0.47282 \times 10^{-3}$ | $-0.49028 \times 10^{-5}$ | $0.27635 \times 10^{-5}$ |
| 6 | 0.00 | $0.45750 \times 10^{-3}$ | $0.94110 \times 10^{-5}$ | $0.22957 \times 10^{-5}$ |
| 10 | 0.00 | $-0.10177 \times 10^{-3}$ | $0.64984 \times 10^{-5}$ | $-0.13413 \times 10^{-6}$ |

Table 10 shows the numerical values of each condition for each embodiment.

TABLE 10

| | Embod.1 | Embod.2 | Embod.3 | Embod.4 | Embod.5 | Embod.6 | Embod.7 | Embod.8 | Embod.9 |
|---|---|---|---|---|---|---|---|---|---|
| Cond. (1) | 0.490 | 0.658 | 0.677 | 0.683 | 0.734 | 0.587 | 0.594 | 0.590 | 0.591 |
| Cond. (2) | 0.784 | 0.869 | 1.017 | 1.078 | 0.957 | 0.955 | 0.954 | 0.930 | 0.957 |
| Cond. (3) | 0.765 | 0.573 | 0.732 | 0.753 | 0.564 | 0.808 | 0.783 | 0.759 | 0.788 |
| Cond. (4) | 0.617 | 0.602 | 0.643 | 0.610 | 0.560 | 0.615 | 0.614 | 0.621 | 0.617 |
| Cond. (5) | — | — | 21.3 | 21.3 | 21.3 | — | — | — | — |
| Cond. (6) | 0.00 | 1.41 | 1.07 | 0.39 | 0.92 | 1.00 | 1.00 | 1.00 | 0.78 |
| Cond. (7) | 0.00 | 0.00 | 0.79 | 0.00 | 0.98 | 1.00 | 1.00 | 1.00 | 1.37 |
| Cond. (8) | 0.87 | 0.70 | 0.79 | 0.75 | 0.40 | 0.89 | 0.95 | 0.95 | 0.98 |
| Cond. (9) | 0.94 | 0.85 | 0.83 | 0.68 | 0.74 | 0.69 | 0.72 | 0.72 | 0.72 |
| Cond. (10) | 1.83 | 1.81 | 1.81 | 1.85 | 1.85 | 1.85 | 1.85 | 1.76 | 1.81 |

As can be understood from Table 10, only the 3rd, 4th and 5th embodiments satisfy condition (5). This is because the positive second lens group 20 of these embodiments employs the two-lens-element arrangement. Other than these embodiments, there are no corresponding lens elements therein.

All the embodiments except the 1st, 2nd and 4th ones satisfy conditions (1) through (10). The 3rd, 5th, 6th, 7th, 8th and 9th embodiments satisfy conditions (6) through (9). This is because the object-side positive lens element of the positive second lens group 20 in the 1st, 2nd and 4th embodiments is not a lens element having an aspherical surface on each surface thereof.

According to the above description, a telephoto three-lens-group zoom lens system for a digital camera having a wide-angle range (half angle of view of more than 30°), such as a zoom ratio of about 2 to 3 can be achieved.

What is claimed is:

1. A zoom lens system comprising a negative first lens group, a positive second lens group, and a positive third lens group having a positive lens element, in this order from an object, wherein:

upon zooming from the short focal length extremity to the long focal length extremity, the distance between said negative first lens group and said positive second lens group decreases, and the distance between said positive second lens group and said positive third lens group increases;

said negative first lens group comprises a negative lens element and a positive lens element, in this order from said object;

said positive second lens group comprises a positive lens element and a negative lens element, in this order from said object;

said positive second lens group satisfies the condition: vs<23 said zoom lens system satisfies the following conditions:

$0.4<(fw \cdot ft)^{1/2}/|f1|<0.8 \ (f1<0)$ $0.7<(fw \cdot ft)^{1/2}/f2<1.4$ $0.4<(fw \cdot ft)^{1/2}/f3<0.9$ wherein fw designates the focal length of the entire zoom lens system at the short focal length extremity;

ft designates the focal length of the entire zoom lens system at the long focal length extremity;

fi designates the focal length of the ith lens group (i=1~3); and vs designates the Abbe number of the most image-side negative lens element in said positive second lens group.

2. The zoom lens system according to claim 1, wherein the most image-side lens element of said positive second lens group comprises a lens element having a concave surface facing toward an image, and said lens element satisfies the following condition:

$0.4<Rs/fw<0.8$ wherein

Rs designates the radius of curvature of said concave surface of said lens element.

3. The zoom lens system according to claim 1, wherein said negative first lens group comprises a negative lens element and a positive lens element, in this order from said object;

wherein said positive second lens group comprises two positive lens elements and a negative lens element, in this order from said object; and wherein said positive third lens group comprises a positive lens element.

4. A zoom lens system comprising a negative first lens group, a positive second lens group, and a positive third lens group, in this order from an object, wherein upon zooming from the short focal length extremity to the long focal length extremity, the distance between said negative first lens group and said positive second lens group decreases, and the distance between said positive second lens group and said positive third lens group increases;

wherein said positive second lens group comprises a single positive lens element, and a single negative lens element or cemented lens elements which as a whole have a negative refractive power;

wherein said third lens group is stationary upon zooming; and wherein said single positive lens element is provided with an aspherical surface on each surfaces thereof, and satisfies the following conditions:

$0.6<|\Delta I_{R1}/I_{R1}|<1.4$ $(\Delta I_{R1}/I_{R1}<0)$ $0.6<|\Delta I_{R2}/I_{R2}|<1.4$ $(\Delta I_{R2}/I_{R2}<0)$ wherein $\Delta I_{R1}$ designates the amount of change of the third-order spherical aberration coefficient due to the object-side aspherical surface of said single positive lens element with said aspherical surfaces under the condition that the focal length at the long focal length extremity is converted to 1.0;

$I_{R1}$ designates the third-order spherical aberration coefficient due to the object-side paraxial spherical component of said single positive lens element with the aspherical surfaces when the focal length at the long focal length extremity is converted to 1.0;

$\Delta I_{R2}$ designates the amount of change of the third-order spherical aberration coefficient due to the image-side aspherical surface of said single positive lens element with said aspherical surfaces under the condition that the focal length at the long focal length extremity is converted to 1.0; and $I_{R2}$ designates the third-order spherical aberration coefficient due to the image-side paraxial spherical component of said single positive lens element with the aspherical surfaces when the focal length at the long focal length extremity is converted to 1.0.

5. The zoom lens system according to claim 4, satisfying the following condition:

$0.3<LD_{2G}/LD_{3G-im}<1.2$ wherein $LD_{2G}$ designates the distance along the optical axis from the most object-side surface of said positive second lens group to the most image-side surface thereof; and $LD_{3G-im}$ designates the minimum distance along the optical axis from the most object-side surface of said positive third lens group to the image plane over the entire zooming range.

6. The zoom lens system according to claim 4, wherein said negative first lens group comprises a negative lens element and a positive lens element, in this order from said object, wherein the most image-side lens element is provided with an aspherical surface on at least one surface thereof; and wherein said zoom lens system satisfies the following conditions:

$$0.5 < LD_{1G}/fw < 1.0$$

$$1.75 < N_{asp}(1G)$$

wherein $LD_{1G}$ designates the distance along the optical axis from the most object-side surface of said negative first lens group to the most image-side surface thereof;

fw designates the focal length of the entire optical system at the short focal length extremity; and $N_{asp}(1G)$ designates the refractive index of the d-line of the most image-side lens element with the aspherical surface in said negative first lens group.

7. A zoom lens system comprising a negative first lens group, a positive second lens group, and a positive third lens group, in this order from and object, wherein upon zooming from the short focal length extremity to the long focal length extremity, the distance between said negative first lens group and said positive second lens group decreases, and the distance between the positive second lens group and the positive third lens group increases;

wherein said positive second lens group comprises a single positive lens element, and a single negative lens element or cemented lens elements which as a whole have a negative refractive power;

wherein said single positive lens element is provided with an aspherical surfaces on each surface thereof; and wherein said third lens group is stationary upon zooming; and wherein said zoom lens system satisfies the following condition:

$$0.3 < LD_{2G}/LD_{3G-im} < 1.2$$

wherein $LD_{2G}$ designates the distance along the optical axis from the most object-side surface of said positive second lens group to the most image-side surface thereof; and $LD_{3G-im}$ designates the minimum distance along the optical axis from the most object-side surface of said positive third lens group to the image plane over the entire zooming range.

8. The zoom lens system according to claim 7, wherein said negative first lens group comprises a negative lens element and a positive lens element, in this order from said object, wherein the most image-side lens element is provided with an aspherical surface on at least one surface thereof; and wherein said zoom lens system satisfies the following conditions:

$$0.5 < LD_{1G}/fw < 1.0$$

$$1.75 < N_{asp}(1G)$$

wherein $LD_{1G}$ designates the distance along the optical axis from the most object-side surface of said negative first lens group to the most image-side surface thereof;

fw designates the focal length of the entire optical system at the short focal length extremity; and $N_{asp}(1G)$ designates the refractive index of the d-line of the most image-side lens element with the aspherical surface in said negative first lens group.

* * * * *